United States Patent
Ratkovic et al.

(10) Patent No.: US 11,689,413 B2
(45) Date of Patent: Jun. 27, 2023

(54) CONFIGURING SYSTEM RESOURCES FOR DIFFERENT REFERENCE ARCHITECTURES

(71) Applicant: Apstra, Inc., Menlo Park, CA (US)

(72) Inventors: Aleksandar Luka Ratkovic, Palo Alto, CA (US); Mansour Jad Karam, San Francisco, CA (US)

(73) Assignee: Apstra, Inc., Menlo Park, CA (US)

( * ) Notice: Subject to any disclaimer, the term of this patent is extended or adjusted under 35 U.S.C. 154(b) by 0 days.

(21) Appl. No.: 17/397,520

(22) Filed: Aug. 9, 2021

(65) Prior Publication Data

US 2021/0367837 A1 Nov. 25, 2021

Related U.S. Application Data

(63) Continuation of application No. 16/442,269, filed on Jun. 14, 2019, now Pat. No. 11,088,900, which is a (Continued)

(51) Int. Cl.
*H04L 41/0803* (2022.01)
*H04L 41/5054* (2022.01)
(Continued)

(52) U.S. Cl.
CPC .......... *H04L 41/0803* (2013.01); *H04L 41/12* (2013.01); *H04L 41/5054* (2013.01); *H04L 67/51* (2022.05)

(58) Field of Classification Search
CPC . H04L 41/0803; H04L 41/12; H04L 41/5054; H04L 67/16
See application file for complete search history.

(56) References Cited

U.S. PATENT DOCUMENTS 6,246,680 B1 * 6/2001 Muller ................. H04L 49/602
  370/395.72
6,339,832 B1 * 1/2002 Bowman-Amuah ... G06F 9/542
  710/48
(Continued)

FOREIGN PATENT DOCUMENTS

CN    104272294 A    1/2015
EP    2237530 A1    10/2010
(Continued)

OTHER PUBLICATIONS

High et al. "IBM SOA Foundation—Architecture Overview IBM's SOA Foundation An Architectural Introduction and Overview", Nov. 1, 2005 (2005-11-81). XP855217842. Retrieved from the Internet: URL: http://www2.computable.nl/downloads/ibm_ws-soa-whitepaper.pdf.

(Continued)

*Primary Examiner* — Jimmy H Tran
(74) *Attorney, Agent, or Firm* — Shumaker & Sieffert, P.A.

(57) ABSTRACT

A specification of an intent that identifies a desired service and a reference architecture is received. The desired service is rendered to provide instructions for dispatch to a plurality of devices having roles. Rendering the desired service includes invoking a service rendering program function based on the reference architecture and a role of a specific device. A new reference architecture may be implemented by specifying a new service rendering program function for the new reference architecture.

20 Claims, 20 Drawing Sheets

Related U.S. Application Data continuation of application No. 15/163,308, filed on May 24, 2016, now Pat. No. 10,374,872.

(51) Int. Cl.
*H04L 41/12* (2022.01)
*H04L 67/51* (2022.01)

(56) References Cited

U.S. PATENT DOCUMENTS

| | | | |
|---|---|---|---|
| 6,434,568 B1 * | 8/2002 | Bowman-Amuah | G06F 16/289 |
| 6,477,580 B1 * | 11/2002 | Bowman-Amuah | G06F 9/54 709/236 |
| 6,571,282 B1 * | 5/2003 | Bowman-Amuah | H04L 67/303 719/329 |
| 6,601,234 B1 * | 7/2003 | Bowman-Amuah | G06Q 10/06375 717/107 |
| 6,615,199 B1 * | 9/2003 | Bowman-Amuah | G06F 9/449 706/50 |
| 6,640,244 B1 * | 10/2003 | Bowman-Amuah | G06F 9/466 707/999.01 |
| 6,640,249 B1 * | 10/2003 | Bowman-Amuah | G06F 8/36 709/228 |
| 6,704,873 B1 * | 3/2004 | Underwood | H04L 67/10 709/249 |
| 6,842,906 B1 * | 1/2005 | Bowman-Amuah | G06F 9/465 719/330 |
| 7,380,025 B1 * | 5/2008 | Riggins | H04L 41/0809 710/10 |
| 7,636,771 B2 | 12/2009 | Torii | |
| 7,693,877 B1 * | 4/2010 | Zasman | G06F 16/185 707/707 |
| 7,783,468 B2 * | 8/2010 | Abu el Ata | G06T 11/206 703/2 |
| 7,870,238 B2 * | 1/2011 | Pusateri | H04L 41/022 709/227 |
| 8,156,207 B2 * | 4/2012 | Wood | H04L 67/125 709/221 |
| 8,260,893 B1 * | 9/2012 | Bandhole | G06F 9/5083 709/224 |
| 8,312,419 B2 * | 11/2012 | Wilcock | G06F 8/10 717/104 |
| 8,318,493 B2 | 11/2012 | Tao et al. | |
| 8,386,593 B1 | 2/2013 | Gao et al. | |
| 8,621,419 B2 * | 12/2013 | Woodgeard | G06F 8/20 717/121 |
| 8,737,993 B2 | 5/2014 | Alves et al. | |
| 8,775,649 B2 * | 7/2014 | Blaukopf | G06F 8/00 709/230 |
| 8,782,182 B2 | 7/2014 | Chaturvedi et al. | |
| 8,819,202 B1 * | 8/2014 | Carolan | H04L 41/5054 709/223 |
| 8,849,973 B2 | 9/2014 | Leib et al. | |
| 8,869,236 B1 | 10/2014 | Tonogai et al. | |
| 8,898,763 B1 * | 11/2014 | Mannepalli | H04L 63/10 726/6 |
| 8,918,493 B1 * | 12/2014 | Beach | H04L 61/6068 709/223 |
| 9,037,969 B2 | 5/2015 | Wolff-Petersen et al. | |
| 9,087,319 B2 * | 7/2015 | Nguyen | H04L 12/185 |
| 9,094,299 B1 * | 7/2015 | Rao D.S. | H04L 41/0803 |
| 9,197,517 B2 * | 11/2015 | Ravichandran | G06Q 30/0251 |
| 9,524,495 B1 * | 12/2016 | Hansen | G06Q 30/0205 |
| 9,621,423 B1 * | 4/2017 | Beach | H04L 67/1097 |
| 9,720,731 B2 * | 8/2017 | Dan | H04L 47/748 |
| 9,753,838 B2 * | 9/2017 | Baker | G06F 11/3604 |
| 9,762,402 B2 * | 9/2017 | Batz | H04L 41/0893 |
| 9,825,769 B2 * | 11/2017 | Batz | H04M 15/8214 |
| 10,063,428 B1 | 8/2018 | Karam et al. | |
| 10,277,461 B1 | 4/2019 | A et al. | |
| 10,313,206 B1 | 6/2019 | Karam et al. | |
| 10,333,776 B2 | 6/2019 | Karam et al. | |
| 10,374,872 B2 | 8/2019 | Ratkovic et al. | |
| 10,389,573 B2 * | 8/2019 | Karam | H04L 41/046 |
| 10,516,761 B1 | 12/2019 | A et al. | |
| 10,558,542 B1 | 2/2020 | A et al. | |
| 10,630,540 B2 | 4/2020 | Karam et al. | |
| 10,698,714 B2 | 6/2020 | Krishnamurthy et al. | |
| 10,756,983 B2 | 8/2020 | Ratkovic et al. | |
| 11,088,900 B2 | 8/2021 | Ratkovic et al. | |
| 2002/0085696 A1 * | 7/2002 | Martin | H04Q 3/0041 379/201.03 |
| 2002/0112053 A1 | 8/2002 | Christensen et al. | |
| 2002/0178380 A1 | 11/2002 | Wolf et al. | |
| 2003/0009540 A1 * | 1/2003 | Benfield | H04L 41/046 709/223 |
| 2003/0009552 A1 * | 1/2003 | Benfield | H04L 41/22 709/224 |
| 2003/0041238 A1 * | 2/2003 | French | H04L 67/34 713/153 |
| 2003/0058277 A1 * | 3/2003 | Bowman-Amuah | G06F 16/289 715/765 |
| 2003/0154279 A1 * | 8/2003 | Aziz | H04L 9/40 709/225 |
| 2003/0172145 A1 * | 9/2003 | Nguyen | H04L 12/185 709/223 |
| 2004/0025157 A1 * | 2/2004 | Blight | G06F 8/61 717/174 |
| 2004/0059812 A1 | 3/2004 | Assa | |
| 2005/0055350 A1 * | 3/2005 | Werme | G06F 9/54 |
| 2005/0091068 A1 | 4/2005 | Ramamoorthy | |
| 2005/0091346 A1 * | 4/2005 | Krishnaswami | H04L 63/101 719/310 |
| 2005/0097146 A1 * | 5/2005 | Konstantinou | H04L 41/0803 |
| 2005/0223021 A1 * | 10/2005 | Batra | G06Q 10/00 707/999.102 |
| 2006/0080425 A1 * | 4/2006 | Wood | H04L 67/1095 709/223 |
| 2006/0241931 A1 * | 10/2006 | Abu el Ata | G06Q 10/00 703/27 |
| 2006/0291434 A1 * | 12/2006 | Gu | H04L 67/02 370/338 |
| 2007/0130192 A1 | 6/2007 | Bolder et al. | |
| 2007/0150561 A1 | 6/2007 | Courtney | |
| 2007/0203740 A1 * | 8/2007 | Abu El Ata | G06Q 10/06 703/2 |
| 2007/0294312 A1 * | 12/2007 | Seshadri | H04L 41/064 |
| 2008/0059214 A1 * | 3/2008 | Vinberg | G06Q 10/067 705/348 |
| 2009/0007131 A1 * | 1/2009 | Woodgeard | G06F 9/5072 718/104 |
| 2009/0059814 A1 | 3/2009 | Nixon et al. | |
| 2009/0112668 A1 * | 4/2009 | Abu El Ata | G06Q 10/0633 |
| 2009/0122706 A1 * | 5/2009 | Alfano | H04L 41/5003 370/252 |
| 2009/0198797 A1 | 8/2009 | Wang et al. | |
| 2009/0282129 A9 | 11/2009 | Tindal | |
| 2010/0115490 A1 * | 5/2010 | Wilcock | G06F 8/10 717/104 |
| 2010/0293364 A1 | 11/2010 | Maini | |
| 2010/0306275 A1 | 12/2010 | Maheshwari et al. | |
| 2012/0197686 A1 * | 8/2012 | Abu El Ata | G06Q 10/06393 705/7.39 |
| 2012/0233315 A1 * | 9/2012 | Hoffman | G06F 9/5072 709/224 |
| 2013/0060929 A1 | 3/2013 | Koponen et al. | |
| 2013/0061146 A1 * | 3/2013 | Kirby | G06Q 10/06 715/738 |
| 2013/0166681 A1 * | 6/2013 | Thompson | H04L 47/806 709/217 |
| 2013/0346591 A1 * | 12/2013 | Carroll | G06F 9/5072 709/224 |
| 2014/0052864 A1 * | 2/2014 | Van Der Linden | H04L 67/1097 709/226 |
| 2014/0096249 A1 | 4/2014 | Dupont et al. | |

(56) References Cited

U.S. PATENT DOCUMENTS

| | | |
|---|---|---|
| 2014/0112205 A1* | 4/2014 | Prakash .............. H04L 12/4625 370/256 |
| 2014/0200858 A1 | 7/2014 | Chatow et al. |
| 2014/0258485 A1* | 9/2014 | Yang ........................ H04L 41/12 709/223 |
| 2015/0015376 A1 | 1/2015 | Jenkins |
| 2015/0074639 A1* | 3/2015 | Sanghvi .............. H04L 41/0843 717/120 |
| 2015/0081885 A1* | 3/2015 | Thomas .............. H04L 41/5054 709/224 |
| 2015/0124629 A1* | 5/2015 | Pani .................... H04L 41/5054 370/248 |
| 2015/0188760 A1* | 7/2015 | Anumala .............. H04L 41/083 370/254 |
| 2015/0188769 A1* | 7/2015 | Gu ...................... H04L 63/0272 726/3 |
| 2015/0188774 A1 | 7/2015 | Nadaf et al. |
| 2015/0188808 A1* | 7/2015 | Ghanwani ........... H04L 41/0663 709/244 |
| 2015/0212812 A1* | 7/2015 | Tripathi ............. G06Q 10/0633 717/120 |
| 2015/0220308 A1* | 8/2015 | Condon .................... G06F 8/20 717/104 |
| 2015/0220330 A1* | 8/2015 | Borden ..................... G06F 8/31 717/121 |
| 2015/0248487 A1 | 9/2015 | Baranowski et al. |
| 2015/0304164 A1 | 10/2015 | Goetje |
| 2015/0324488 A1 | 11/2015 | Chandnani et al. |
| 2015/0339263 A1* | 11/2015 | Abu El Ata ..... G06Q 10/06393 703/2 |
| 2015/0379409 A1 | 12/2015 | Hu et al. |
| 2015/0381515 A1* | 12/2015 | Mattson .............. H04L 41/5051 707/722 |
| 2016/0050116 A1* | 2/2016 | Sheshadri .............. H04L 67/125 709/221 |
| 2016/0142243 A1* | 5/2016 | Karam .................... G06F 16/13 709/202 |
| 2016/0149769 A1* | 5/2016 | Joshi .................. H04L 41/5006 715/739 |
| 2016/0156513 A1* | 6/2016 | Zhang ..................... H04W 4/70 709/220 |
| 2016/0188767 A1 | 6/2016 | Razin |
| 2016/0212116 A1* | 7/2016 | Becker .................... H04L 9/321 |
| 2016/0234073 A1* | 8/2016 | Maes ...................... H04L 41/12 |
| 2016/0239595 A1* | 8/2016 | Maes ...................... G06F 9/5061 |
| 2016/0241444 A1* | 8/2016 | Maes ...................... G06F 9/5072 |
| 2016/0254965 A1* | 9/2016 | Maes .................... H04L 41/5041 709/223 |
| 2016/0308982 A1* | 10/2016 | Greene .................. H04L 67/42 |
| 2016/0328313 A1* | 11/2016 | Baker ................ G06F 11/3604 |
| 2016/0342510 A1 | 11/2016 | Pani |
| 2016/0344565 A1* | 11/2016 | Batz ....................... H04L 67/14 |
| 2016/0344772 A1 | 11/2016 | Monahan et al. |
| 2016/0344803 A1* | 11/2016 | Batz ...................... H04M 15/66 |
| 2017/0004018 A1* | 1/2017 | Mangtani .............. G06F 9/5072 |
| 2017/0078771 A1* | 3/2017 | Lingampalli ....... H04Q 11/0067 |
| 2017/0109907 A1 | 4/2017 | Hamedani |
| 2017/0222889 A1* | 8/2017 | Zong .................. H04L 41/0893 |
| 2017/0223117 A1* | 8/2017 | Messerli .............. H04L 47/783 |
| 2017/0237668 A1* | 8/2017 | Hall .................... H04L 47/2466 370/235 |
| 2017/0250881 A1 | 8/2017 | Kellicker |
| 2017/0331828 A1 | 11/2017 | Caldera et al. |
| 2018/0137155 A1 | 5/2018 | Majumdar |
| 2018/0203794 A1* | 7/2018 | Voccio ..................... G06F 8/70 |
| 2018/0210927 A1 | 7/2018 | Karam et al. |
| 2018/0309517 A1* | 10/2018 | Zheng ................ H04L 12/4641 |
| 2018/0316576 A1 | 11/2018 | Kang et al. |
| 2019/0005576 A1* | 1/2019 | Mick .................... H04L 41/5054 |
| 2019/0132214 A1 | 5/2019 | Porras .................. H04L 41/147 |
| 2019/0140895 A1* | 5/2019 | Ennis, Jr ............. H04L 41/0893 |
| 2019/0166011 A1* | 5/2019 | Cordray ................ G06F 15/177 |
| 2019/0173805 A1 | 6/2019 | Balan et al. |
| 2019/0190799 A1* | 6/2019 | Chatterjee ........... H04L 67/1097 |
| 2019/0238423 A1 | 8/2019 | Karam et al. |
| 2019/0319830 A1 | 10/2019 | Karam et al. |
| 2019/0349250 A1* | 11/2019 | Chen ..................... H04L 69/324 |
| 2020/0007495 A1 | 1/2020 | Balamurugan et al. |
| 2020/0112486 A1* | 4/2020 | Lissack .................. H04L 41/22 |
| 2020/0136917 A1 | 4/2020 | Kang et al. |
| 2020/0213189 A1 | 7/2020 | Karam et al. |
| 2020/0274772 A1 | 8/2020 | A et al. |
| 2020/0313957 A1 | 10/2020 | A et al. |
| 2020/0313980 A1 | 10/2020 | A et al. |
| 2020/0326924 A1 | 10/2020 | A et al. |
| 2020/0328949 A1 | 10/2020 | Ratkovic et al. |
| 2020/0344171 A1 | 10/2020 | Sharma et al. |
| 2021/0218621 A1* | 7/2021 | Karam ................ H04L 41/0803 |
| 2022/0075604 A1* | 3/2022 | Duggal ..................... G06F 8/60 |
| 2022/0075848 A1* | 3/2022 | Duggal ................ H04L 63/0263 |
| 2022/0086033 A1* | 3/2022 | Karam .................. H04L 41/022 |
| 2022/0224608 A1* | 7/2022 | Karam .................... H04L 67/56 |
| 2022/0263730 A1* | 8/2022 | Link .................... H04L 41/5058 |
| 2022/0404950 A1* | 12/2022 | Van Wie ............. H04L 12/1827 |

FOREIGN PATENT DOCUMENTS

| | | |
|---|---|---|
| WO | 2007140337 A2 | 12/2007 |
| WO | 2015065382 A1 | 5/2015 |

OTHER PUBLICATIONS

Bjorklund, "YANG—A Data Modeling Language for the Network Configuration Protocol (NETCONF)," Internet Engineering Task Force (IETF), RFC 6020, Oct. 2010, 174 pp.

Enns et al., "Network Configuration Protocol (NETCONF)," Internet Engineering Task Force (IETF), RFC 6241, Jun. 2011, 114 pp.

Enns, "NETCONF Configuration Protocol," Network Working Group, RFC 4741, Dec. 2006, 96 pp.

Harrington et al., "An Architecture for Describing Simple Network Management Protocol (SNMP) Management Frameworks," Network Working Group, RFC 3411, Dec. 2002, 65 pp.

Prakash et al., "PGA: Using Graphs to Express and Automatically Reconcile Network Policies," SIGCOMM 2015, Aug. 17-21, 2015, London, United Kingdom, 14 pp.

U.S. Appl. No. 16/360,660, filed Mar. 21, 2019, naming inventors Rachamadugu et al.

U.S. Appl. No. 16/400,936, filed May 1, 2019, naming inventors Ratkovic et al.

U.S. Appl. No. 17/104,804, filed Nov. 25, 2020, naming inventors Hafeez et al.

Prosecution History from U.S. Appl. No. 15/163,308, dated Feb. 2, 2018 through Mar. 21, 2019, 78 pp.

First Office Action and Search Report, and translation thereof, from counterpart Chinese Application No. 201780025453.1, dated Jan. 6, 2021, 11 pp.

International Search Report and Written Opinion of International Application No. PCT/US2017/018812, dated May 8, 2017, 9 pp.

International Preliminary Report on Patentability from International Application No. PCT/US2017/018812, dated Nov. 27, 2018, 7 pp.

Extended Search Report from counterpart European Application No. 17803187.8, dated Nov. 4, 2019, 9 pp.

Response to Extended Search Report dated Nov. 4, 2019, from counterpart European Application No. 17803187.8, filed May 7, 2020, 13 pp.

Notice of Intent to Grant and Text Intended to Grant from counterpart European Application No. 17803187.8, dated Aug. 31, 2020, 79 pp.

Extended Search Report from counterpart European Application No. 20209925.5, dated Jan. 22, 2021, 6 pp.

Prosecution History from U.S. Appl. No. 16/442,269, dated Jul. 27, 2020 through May 20, 2021, 81 pp.

Response to Extended Search Report dated Jan. 22, 2021, from counterpart European Application No. 20209925.5, filed Nov. 19, 2021, 14 pp.

(56) References Cited

OTHER PUBLICATIONS

Second Office Action and Search Report, and translation thereof, from counterpart Chinese Application No. 201780025453.1, dated Aug. 13, 2021, 7 pp.
Notice of Intent to Grant and Text Intended to Grant from counterpart European Application No. 20209925.5 dated Feb. 9, 2022, 78 pp.

* cited by examiner

▽ spine_1:Etherneti1/5<-->leaf_3:swpt49 {3}
    ▽ endpoint {2}
        ▽ leaf_3 {3}
            interface : swpt49
            ip    : 172.25.0.16/31
            name : leaf_3
        ▽ spine_1 {3}
            interface : Etherneti1/5
            ip    : 172.25.0.17/31
            name : spine_1
    role : fabric
    name : spine_1:Etherneti1/5<-->leaf_3:swpt49
    ...

▽ bgpSession {50}
    ▽ 172.25.0.16:64516->172.25.0.17:60113 {7}
        name : 172.25.0.16:64516->172.25.0.17:60113
        source_ip : 172.25.0.16
        dest_asn : 60113     } 804
        role : fabric
        type : BGPSession
        source_asn : 64516
        dest_ip : 172.25.0.17
        ...

▽ service {1}
    ▽ bgp {4}
        router_id : 172.22.0.5
        type : Service   } 806
        name : bgp
        asn : 64516
        ...

▽ ip {53}
    ▽ IP-172.20.0.224 {4}
        ipv4_address : 172.20.0.224
        type : IP   } 808
        role : server
        name : IP-172.20.0.224
        ...

FIG. 8B

▽ interface {52}
   ▽ IF-swpt32 {4}
      type : Interface
      intfName : swpt32
      role : server
      name : IF-swpt32
   ...        ⎬ 810

▽ peer {4}
   ▽ swpt49 {4}
      deviceName : spine_1
      intfName : Etherneti1/5
      type : Peer
      name : swpt49
   ...        ⎬ 812

▽ networkDevice {1}
   ▽ leaf_3 {3}
      model : Celestica_RedstoneXP
      type : NetworkDevice
      name : leaf_3
   ...        ⎬ 814

FIG. 8B (Cont.)

▽ routing [4]
    ▽ 0 {2}
        filename : /etc/quagga/Quagga.conf
        ▽
            data [433]
                0 : # This file was generated by AOS. Do not edit by hand.
                1 : VALUE
                2 : log timestamp precision 6
                3 : log file /var/log/quagga/quagga.log
                4 : VALUE
                5 : ip prefix-list AllPodNetworks seq 10 permit 0.0.0.0/0 le 32
                6 : !
                7 : route-map L3SrvrEdgeSubnets permit 10
                8 : match ip address prefix-list L3SrvrEdgeSubnets
                9 : !
                10 : route-map AllPodNetworks permit 10
                11 : match ip address prefix-list AllPodNetworks
                12 : !
                13 : router bgp 64516
                14 : bgp router-id 172.22.0.5
                15 : bgp log-neighbor-changes
                16 : bgp bestpath as-path multipath-relax no-as-set
                ...

```
{
    "reference architecture": "l3clos",
    "node": {
        "leaf_1": {
            "role": "leaf"
        },
        "leaf_2": {
            "role": "leaf"
        },
        "leaf_3": {
            "role": "leaf"
        },
        "spine_1": {
            "role": "spine"
        },
        "spine_2": {
            "role": "spine"
        }
    },
    "link": {
        "leaf_1<->spine_1": {
            "endpoint": ["leaf_1", "spine_1"]
        },
        "role": "fabric"
        },
        "leaf_1<->spine_2": {
            "endpoint": ["leaf_1", "spine_2"]
        },
```

1000 — 1002 (reference architecture)
1004 (node block)
1006 (link block)

FIG. 10A

```
{
  "reference architecture": "access_aggregation",          ⎫
  "node": {                                                 ⎪ 1012
    "access_1": {                                           ⎪
      "role": "access"                                      ⎪
    },                                                      ⎪
    "access_2": {                                           ⎪
      "role": "access"                                      ⎪
    },                                                      ⎪
    "aggregation_1": {                                      ⎪
      "role": "aggregation"                                 ⎪
    },                                                      ⎬ 1014
    "aggregation_2": {                                      ⎪
      "role": "aggregation"                                 ⎪
    },                                                      ⎪
    "core_1": {                                             ⎪
      "role": "core"                                        ⎪
    },                                                      ⎪
    "core_2": {                                             ⎪
      "role": "core"                                        ⎪
    }                                                       ⎪
  },                                                        ⎭
  ...
  "link": {                                                 ⎫
      "access_1<->aggegation_1": {                          ⎪
        "endpoint": ["access_1", "aggegation_1"]            ⎪
      },                                                    ⎪
      "role": "access_aggregation"                          ⎬ 1016
    },                                                      ⎪
     "access_1<->aggegation_2": {                           ⎪
        "endpoint": ["access_1", "aggegation_2"]            ⎪
      },                                                    ⎪
      "role": "access_aggregation"                          ⎪
    },                                                      ⎭
```

```
"access_2<->aggegation_1": {
    "endpoint": ["access_2", "aggegation_1"]
  },
  "role": "access_aggregation"
},
"access_2<->aggegation_2": {
    "endpoint": ["access_2", "aggegation_2"]
  },
  "role": "access_aggregation"
},
"aggegation_1<->core_1": {
    "endpoint": ["aggegation_1 ", "core_1 "]
  },
  "role": "aggregation_core"
},
"aggegation_1<->core_2": {
    "endpoint": ["aggegation_1", "core_2"]
  },
  "role": "aggregation_core"
},
"aggegation_2<->core_1": {
    "endpoint": ["aggegation_ 2", "core_1"]
  },
  "role": "aggregation_core"
},
"aggegation _2<->core_2": {
    "endpoint": ["aggegation_ 2", "core_2"]
  },
  "role": "aggregation_core"
},
 }
}
```

```
def l3clos_leaf(blueprint, node_instance):
    # Configuration rendering function for a device playing
    # a leaf role in the reference architecture l3clos.
    # Specific node instance is passed as node_instance object
    # blueprint contains required context for the node instance
    # (for example what links are attached to it and what are the role of the links)

#implementation
    pass:

def l3clos_spine(blueprint, node_instance):
    # Configuration rendering function for a device playing
    # a spine role in the reference architecture l3clos.
    # Specific node instance is passed as node_instance object
    # blueprint contains required context for the node instance
    # (for example what links are attached to it and what are the role of the links)

#implementation
    pass:

def access_aggregation_access(blueprint, node_instance):
    # Configuration rendering function for a device playing
    # an access role in the reference architecture access_aggregation.
    # Specific node instance is passed as node_instance object
    # blueprint contains required context for the node instance
    # (for example what links are attached to it and what are the role of the links)

#implementation
    pass:

def access_aggregation_aggregation(blueprint, node_instance ):
    # Configuration rendering function for a device playing
    # an aggregation role in the reference architecture access_aggregation.
    # Specific node instance is passed as node_instance object
    # blueprint contains required context for the node instance
    # (for example what links are attached to it and what are the role of the links)

#implementation
    pass:

def access_aggregation_core(blueprint, node_instance):
    # Configuration rendering function for a device playing
    # a core role in the reference architecture access_aggregation.
    # Specific node instance is passed as node_instance object
    # blueprint contains required context for the node instance
    # (for example what links are attached to it and what are the role of the links)

#implementation
    pass:
```

FIG. 10E (Cont.)

CONFIGURING SYSTEM RESOURCES FOR DIFFERENT REFERENCE ARCHITECTURES

CROSS REFERENCE TO OTHER APPLICATIONS

This application is a continuation of U.S. patent application Ser. No. 16/442,269, filed 14 Jun. 2019, which is a continuation of U.S. patent application Ser. No. 15/163,308, filed 24 May 2016, the entire content of each application is incorporated herein by reference.

BACKGROUND OF THE INVENTION

In order to configure a network, a network administrator may specify a declarative requirement of a desired network configuration. For example, the network administrator may specify a declarative requirement of what the final network configuration should be rather than the mechanics of how to accomplish the network configuration. Often these declarative requirements must include very specific types of requirements specific to a particular type of network architecture to be created. However, in many instances, the network administrator may desire flexibility in being able to utilize different network architectures for desired requirements of a service to be provided. For example, rather than limiting a user to a single type of network architecture that has been preconfigured to be able to be implemented, the user may desire to easily change to and implement a new/different network architecture to provide the service of the requirements. Therefore, there exists a need for a more flexible way to specify an intent of a desired service.

BRIEF DESCRIPTION OF THE DRAWINGS

Various embodiments of the invention are disclosed in the following detailed description and the accompanying drawings.

FIG. 8A shows a portion of an example of declarative requirements resulting from the set of requirements received in 502 that has been processed to specify topology of connections between network components.

FIG. 8B shows an example of at least a portion of a verification model (e.g., in JSON format) generated to verify at least a portion of received requirements.

FIG. 10C is an example of a blueprint for an Access Aggregation type reference network architecture.

DETAILED DESCRIPTION

Figure 1:
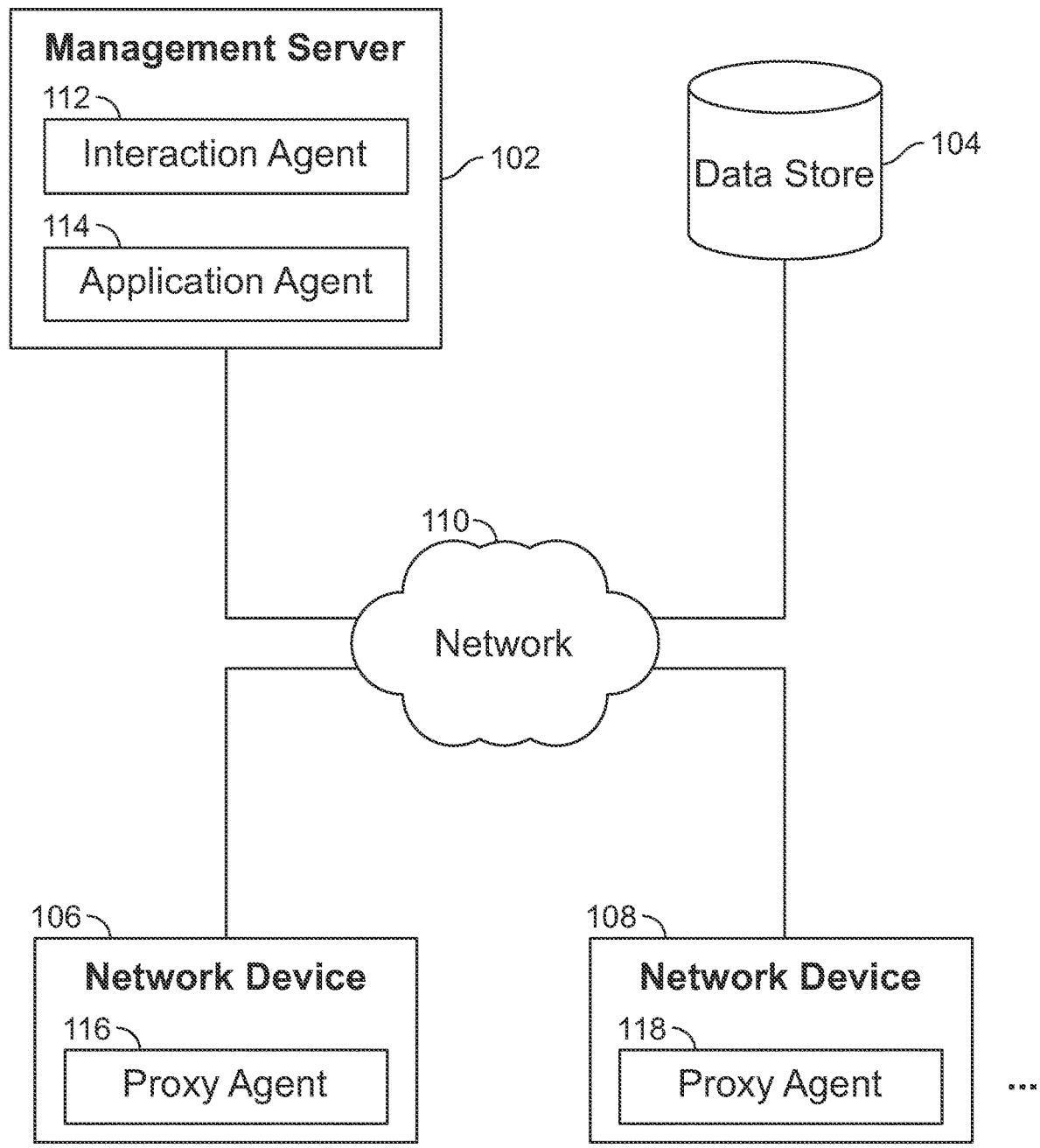
FIG. 1 is a diagram illustrating an embodiment of a network management environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Configuring system resources is disclosed. For example, one or more network devices are configured to provide a network service desired according to declarative requirements. In some embodiments, a specification of an intent that specifies a desired service and a reference architecture to be utilized is received. For example, a user/network administrator specifies declarative requirements of a network service to be configured along with a specification of a network architecture to be utilized to provide the network service. The reference architecture may identify a standard manner in which component systems and devices are to be organized to provide a service. For example, the reference architecture identifies a network topology and one or more protocols to be utilized to provide an intended network service. The service is rendered to provide instructions for dispatch to a plurality of devices having roles. For example, devices that are to provide the service are provided instructions to implement the respective service component at the various devices serving different roles. The roles may correspond to various different types of component systems/devices of the reference architecture. Rendering the service includes specifying a function based on the reference architecture and a role played by a device. For example, for each different combination of reference architecture and role, a different function that renders the service for the device of the role of the reference architecture is specified. When a new reference architecture is to be utilized to implement the service, the specification of the reference architecture may be switched to the new reference architecture and a new program function for each role of the new reference architecture is specified and utilized to render the service for the new reference architecture.

FIG. 1 is a diagram illustrating an embodiment of a network management environment. Management server 102 is connected to data store 104, network device 106, and network device 108 via network 110. In some embodiments, management server 102 provides a network configuration, monitoring, and management solution. For example, a user may utilize a solution at least in part provided by management server 102 to set up a network configuration, set up a network device, monitor performance of a network, monitor devices of a network, automate tasks, and otherwise perform management of devices of the network. In the example shown, management server 102 is utilized to manage at least network device 106 and network device 108. Management server 102 includes interaction agent 112 and application agent 114. For example, interaction agent 112 and application agent 114 are software components and/or hardware components of management server 102. In some embodiments, management server 102 is specialized custom hardware. In some embodiments, management server 102 is utilized to configure hardware network switches.

Interaction agent 112 facilitates interactions with users to receive and provide desired requirements, specifications, and status updates. For example, a user accesses interaction agent 112 via a user interface (e.g., web interface, application interface, command line interface, application programming interface (API), configuration file interface, etc.) provided directly and/or remotely (e.g., via display, wired connection, network, etc.). Using the user interface, a user may provide high level requirements that specify a desired configuration of a desired network/device and/or receive information regarding status of devices/components of the desired network and/or an implementation status regarding the desired configuration requirements. Interaction agent 112 may manage a plurality of application agents. For example, interaction agent 112 selects an application agent among a plurality of applications to achieve/complete a desired network requirement. In some embodiments, interaction agent 112 is accessed by a user via a RESTful API. For example, HTTP methods (e.g., GET, PUT, POST, DELETE, etc.) are utilized to access and manage information via the API. URIs may be utilized to reference state and resources. In some embodiments, a user specifies one or more declarative requirements of a desired network configuration using interaction agent 112. The declarative requirements may be specified at one or more selected stages/levels among a plurality of stages/levels. In some embodiments, a user specifies one or more constraints (e.g., resources, policies, etc.) of a desired network configuration using interaction agent 112.

Application agent 114 implements and manages the desired network requirements, configurations, and status updates across various network devices. In some embodiments, application agent 114 provides device requirement instructions to and receives status information from various devices of a network being managed. For example, using desired network requirements, application agent 114 determines individual device requirements to implement the desired network requirements. The device requirements determined by application agent 114 may be declarative device requirements such that the device requirements may be translated to any of a number of different native device instructions (e.g., native instructions of devices of different vendors, device versions, device operating systems, programming interfaces, etc.) to implement the device requirements. In the example shown, application agent 114 has selected network devices 106 and 108 to implement the desired network requirements and generates unique device requirements for each network device 106 and 108.

In some embodiments, in translating the desired network requirements to the device requirements, a plurality of different successive processing stages/levels may be utilized. The network requirements may be specified for any of the different processing stage levels. For example, network requirements may be specified at the most general and highest level and/or at a lower and more specific stage/level. Each processing stage/level may translate an input declarative requirement to an output declarative requirement that may be utilized as the input declarative requirement for the next subsequent lower processing stage/level. For each processing stage/level, the application agent merges an input declarative requirement with one or more constraints (e.g., resources available, policies to follow, etc.) to determine the output declarative requirement. By being able to provide desired declarative network requirements of any selected stage/level of a plurality of different processing stages/levels, a user is given the option to tune the level/amount of control desired by the user in configuring the network. For example, a network administrator who desires to quickly set up a default configuration network may specify declarative requirements at the highest stage/level while a network administrator who desires to set up a more customized and specific network may specify declarative requirements at a lower stage/level. In some embodiments, each processing stage/level performs a different function. For example, one processing stage/level determines a logical connectivity in its output declarative requirements, another processing stage/level determines physical connectivity in its output declarative requirements, and another processing stage/level determines a cabling diagram in its output declarative requirements.

In various embodiments, any number of application agents may exist. Each application agent may perform the same and/or different functions. In some embodiments, application agent 114 and/or another application agent coordinates and performs verification that a service is functioning. For example, the desired configuration of a desired network/device service that has been received is utilized to generate one or more device verification models for one or more devices that are utilized. Each device verification model may identify one or more parameters to be verified/detected for the specific device of the verification model. The device verification model is different from device requirements provided to a device to implement the device requirements to configure the device. For example, device requirements are provided to configure/set up a device to provide service whereas the device verification model is provided to verify a status and/or configuration of the service. In some embodiments, in response to the device verification model, a status report is received from the corresponding device that identifies status of the one or more parameters identified in the verification model. An application agent may then aggregate and analyze one or more status reports to determine whether the service has been properly implemented/configured and/or is properly functioning.

Proxy agent 116 receives its device requirements for network device 106 and proxy agent 118 receives its device requirements for network device 108. Each proxy agent may generate and/or implement/execute native hardware instructions implementing its device requirements to configure its associated individual network device.

In some embodiments, proxy agent 116 receives a device verification model for network device 106 and proxy agent 118 receives a device verification model for network device 108. Each proxy agent may determine one or more status parameters to be reported to verify the corresponding device verification model and gather/detect the determined status parameters. Then each proxy agent may provide a status report of the gathered/detected status parameters to an application agent that is handling the verification of the service being provided (e.g., provided to an application agent of management server 102). In some embodiments, each proxy agent reports information about a status, an operation, and/or other information of its associated device (s). Application agent 114 may then collect and process the reported information to report the information and/or to perform a responsive action. For example, when a proxy agent provides a status update that its associated device is overloaded, the application agent may add a new device to a network to offload processing and/or to move a processing task of the overloaded device to another network device. The collected status information may be provided by application agent 114 to interaction agent 112 as a report and/or a request for action.

Communications between interaction agent 112, application agent 114, and proxy agents 116 and 118 are facilitated via data store 104. In some embodiments, interaction agent 112, application agent 114, and proxy agents 116 and 118 do not directly communicate with each other. For example, rather than maintaining state information and managing communication between agent components directly at each agent component, the data store 104 is utilized to track and provide state information and communications of agent components. All state information (e.g., state of device, requirements, configurations, etc.) of the agents may be stored in data store 104 rather than storing state information in the agents. When data is to be communicated between the agents, a sending agent publishes/stores the data to be communicated to data store 104. The agent receiving the data may read the data from data store 104 and/or may be pushed the data. For example, an agent subscribes to be notified when a certain type of data is stored in data store 104 and the agent is notified when a new or a modification to the certain type of data is received at data store 104. In some embodiments, an agent periodically polls/checks data store 104 for data. Data store 104 may be included in a networked storage service. In the example shown, the agents access data store 104 via network 110. In some embodiments, data store 104 is directly connected to management server 102 via a non-shared connection. In various embodiments, data store 104 is included in any of the components shown in FIG. 1. For example, data store 104 is included in server 102. Data store 104 may include a server that manages data stored in data store 104 (e.g., manages data subscriptions). Examples of data store 104 include a database, a highly available storage, a distributed storage, a cloud storage, a data service, or any other type of data storage.

Network device 106 and network device 108 may be any type of device connected to network 110. Examples of network device 106 and network device 108 include a server, a network switch, a network router, a cache server, a storage device, a hypervisor switch, a virtual router, a load balancer, a firewall, a network fabric device, a virtual network device, a software device, a software component, or any type of computer or networking device that may be physical or virtual. Proxy agent 116 is a software and/or hardware component included in network device 106. Proxy agent 116 manages network device 106. Proxy agent 118 is a software and/or hardware component included in network device 108. Proxy agent 118 manages network device 108. Examples of network 110 include one or more of the following: a direct or indirect physical communication connection, a mobile communication network, Internet, intranet, Local Area Network, Wide Area Network, Storage Area Network, and any other form of connecting two or more systems, components, or storage devices together. Other communication paths may exist and the example of FIG. 1 has been simplified to illustrate the example clearly.

Although single instances of many of the components shown in FIG. 1 have been shown to simplify the diagram, additional instances of any of the components shown in FIG. 1 may exist. For example, any number of management servers, storages, and network devices may exist. Management server 102 may be a cluster of servers and storage 104 may be a distributed storage. Any number of interaction agents, application agents, and/or proxy agents may exist. A single server/device may include any number of interaction agents, application agents, and/or proxy agents. A single interaction agent, application agent, and/or proxy agent may provide a service for a plurality of services/devices. A single interaction agent may interact with a plurality of application agents. For example, different types of network requirements and status updates may be handled by different application agents that all interface with a single interaction agent. Although the example shown in FIG. 1 shows application agent and interaction agent included/installed on the same management server, they may be included in different servers/devices. Although the example shown in FIG. 1 shows each proxy agent included/installed in their respective associated network device, the proxy agents may be included in different servers/devices. For example, the proxy agents are included in management server 102. Although the example shown in FIG. 1 shows that a single proxy agent is only assigned to manage a single associated network device, in some embodiments, a single proxy agent may be assigned to manage a plurality of network devices. Components not shown in FIG. 1 may also exist. In some embodiments, each resource (e.g., each agent, server, and network device) of FIG. 1 may belong to a domain. For example, resources belonging to the same domain are interoperable and may function together to perform a network configuration and/or management task. In some embodiments, each resource may only belong to one domain and only resources within the same domain are guaranteed to be interoperable to perform a network configuration and/or management task. Certain resources may belong to a plurality of domains. A plurality of domains may be utilized to manage a single network. The components shown in FIG. 1 may be components of one or more domains. Any of the components shown in FIG. 1 may be a physical or a virtual component.

Figure 2A:
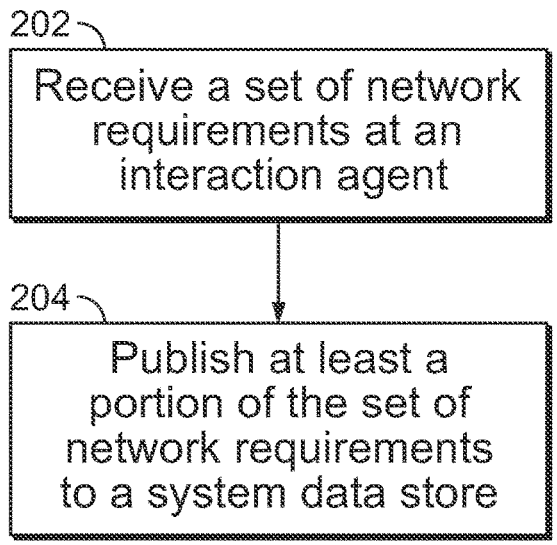
FIG. 2A is a flowchart illustrating an embodiment of a process for publishing network requirements.

FIG. 2A is a flowchart illustrating an embodiment of a process for publishing network requirements. The process of FIG. 2A may be implemented on management server 102 of FIG. 1. In some embodiments, the process of FIG. 2A is performed by interaction agent 112 of FIG. 1.

At 202, a set of network requirements is received at an interaction agent. In some embodiments, the interaction agent is interaction agent 112 of FIG. 1. The interaction agent may interface with a user and/or a user system. The interaction agent may be a software and/or hardware component and may be included in a server utilized to manage a network (e.g., manage network devices). In some embodiments, the interaction agent interacts with (e.g., manages) one or more application agents. For example, the interaction agent selects one or more application agents that will be implementing the set of network requirements and/or reporting on their status. A user or a user system may access the interaction agent via a user interface (e.g., web interface, visual display interface, application interface, command line interface, application programming interface (API), RESTful API, configuration file interface, etc.) provided directly and/or remotely (e.g., via display, wired connection, network, etc.).

In some embodiments, the set of network requirements includes a specification of an intent that identifies a desired service and an associated reference architecture to be used to implement the intent. The reference architecture may identify a standard manner in which component systems and devices are to be organized to provide a service. For example, the reference architecture identifies a network topology and protocol(s) to be utilized to provide an intended network service. The intent may specify one or more requirements (e.g., declarative network requirements) of the desired service independent of the reference architecture to be utilized. For example, the intent may specify that 20 servers are to be networked together. The intent is to be implemented using the specified reference architecture and by changing the specification of the reference architecture, implementation of the same intent may be changed to utilize the newly specified reference architecture. By separating the specification of the intent and the reference architecture, different reference architecture implementations of the intent may be achieved by simply specifying different reference architectures along with the same intent.

In some embodiments, the set of network requirements includes a desired configuration, setting, topology, and/or other specifications of a network/service and/or one or more devices connected or able to be connected to the network. In some embodiments, the set of network requirements includes a set of declarative requirements. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient.

In various embodiments, the set of network requirements specifies a desired configuration, a desired action, a command, or any other instruction or desired result of one or more devices. One example of the set of network requirements is a set of requirements to establish a connected network of servers.

For example, the intent is connect 144 servers together and the reference architecture is a mesh network (e.g., Layer 3 Clos Network). In a Clos Network reference architecture, every lower-tier switch (e.g., leaves) is connected to each of the top-tier switches (e.g., spines) in a full-mesh topology. A portion of an example intent that specifies an instruction to establish an L3 Clos network configuration received via a received requirements file is below:

Network architecture=Clos/BGP
# of switches connected=144
IP address pool=10.0.0.0/20

The above requirements specify that a network with 144 network switches should be established and the network architecture topology of the network to be established is a Clos network using Border Gateway Protocol (BGP) with switched assigned IP address from the range 10.0.0.0 through 10.0.15.255.

In some embodiments, the set of requirements is verified for validity and correctness. For example, it is verified that the set of network requirements has been received from an authorized and validated source, the provided requirement specification syntax is correct, valid requirements have been provided, all required parameters for a desired result have been specified, and provided requirements are able to be achieved via available hardware/software resources/devices.

In some embodiments, the set of requirements is a set of declarative requirements that specify a desired configuration, a desired action, a desired mapping result, a command, or any other desired result of one or more declarative requirement processing stages/levels. In some embodiments, the set of requirements may be specified for one or more selected processing stages/levels of successive declarative requirement processing stages/levels. For example, there exists a plurality of processing successive stages/levels that successively require more specific/lower stage/level declarative requirements at each lower stage/level and a user may specify declarative requirements for any one of the stages/levels. In some embodiments, each of the processing stages/levels determines additional aspects of a network to be configured. For example, the output of each processing stage/level includes additional declarative requirements that further define additional aspects of the desired network.

In some embodiments, the set of declarative requirements is specified for a selected processing stage/level. For example, network declarative requirements can be specified for the most general and highest processing stage/level or for a lower and more specific processing stage/level based on the amount of customization and detail desired to be controlled when automatically setting up a network defined by the specified declarative requirements. Each processing stage/level may translate an input requirement to an output requirement that may be utilized as the input requirement for the next processing stage/level, if applicable. For example, by successively converting declarative requirements to a lower stage/level declarative requirement with more specificity at each of the plurality of processing levels/stages, declarative requirements for each specific device to be configured by each proxy agent of each specific device are determined.

In some embodiments, rather than requiring a user to specify declarative requirements that conform to a single specificity level, the user is able to specify declarative requirements at any of a plurality of different specificity levels corresponding to the plurality of processing levels/stages. Thus, by being able to provide desired network declarative requirements at any of a plurality of different selected levels, a user is given the option to specify the level/amount of control desired by the user in configuring the network. For example, a network administrator who desires to quickly set up a default configuration network may specify declarative requirements at the highest stage/level (e.g., number of servers to be supported) while a network administrator who desires to set up a more customized and specific network may specify declarative requirements at a lower stage/level (e.g., specific cable connection mapping between network switches).

In some embodiments, each stage processes an input requirement using one or more constraints (e.g., resources available, policies to follow, etc.) to determine the output requirement. In some embodiments, constraints are received at the interaction agent. For example, a user provides the constraints (e.g., resources available, policies to follow, etc.) for storage in a data store for use in one or more processing stages. In some embodiments, if a required declarative requirement has not been specified by a user, a default declarative requirement that is consistent with the specified declarative requirement is utilized. In some embodiments, declarative requirements may be specified for a plurality of different processing stages/levels. For example, a user may specify a high level declarative requirement for the starting processing stage/level but also for another lower processing stage/level to customize a desired aspect. In some embodiments, the declarative requirements are specified in JavaScript Object Notation (i.e., JSON) format.

At 204, at least a portion of the set of network requirements is published to a system data store. For example, the set of network requirements is published to data store 104 of FIG. 1. In some embodiments, one or more received constraints are published to a system data store. In some embodiments, one or more constraints may be automatically determined. In some embodiments, the interaction agent is stateless. For example, the interaction agent does not maintain its own storage that tracks states of requirement processing and communication. Rather than storing and keeping track of its state data, the state data is stored/published to a remote network data store (e.g., data store 104 of FIG. 1). By being stateless, the interaction agent may be quickly replaced/restarted when it encounters an error without the need to restore state information in the replaced component.

In some embodiments, publishing the set of network requirements and/or constraints includes storing the set of network requirements and/or constraints in the system data store to allow an application agent to read and access the published set of requirements and/or constraints. Thus, rather than directly communicating the set of network requirements to the application agent, the interaction agent publishes the set of requirements to the storage to communicate the information to the application agent. In some embodiments, publishing the set of requirements includes selecting one or more application agents that are to receive appropriate network requirements. For example, there exists a plurality of different application agents and each application agent performs a different type of processing and/or processing for a different set of one or more network devices. In another example, the same and/or different application agents may perform each processing stage/level of a plurality of different processing stages/levels. In order to achieve/complete the set of network requirements, the set of network requirements may need to be routed to the appropriate application agent for further processing. In some embodiments, the set of network requirements is processed to identify which application agent should receive which portion (or all) of the set of requirements and the requirement(s) to be received by each appropriate application agent is published to a different storage location or identified by a different identifier of the system data store corresponding to the appropriate application agent. For example, the data store includes different data records corresponding to each different application agent and requirement(s) may be communicated to an application agent by publishing requirements to the corresponding data record of the desired application agent. In another example, an identifier included in the published data identifies which application agent should receive the published data. In some embodiments, one or more other network requirements associated with the received set of network requirements are determined and published. For example, a default network requirement for one or more associated processing stages/levels of the received set of network requirements is automatically determined and published for processing.

In some embodiments, the received set of requirements and/or constraints is modified prior to being published. For example, the received set of network requirements is translated into a form that can be published to a data store. In another example, additional requirements determined to be required to achieve the received set of requirements are added. In another example, one or more requirements determined to be not required to achieve the received set of requirements are removed. In another example, one or more requirements of the received set of requirements are modified.

In some embodiments, publishing the set of requirements includes storing/creating an identifier in the system data store that identifies the status of one or more requirements of the set of network requirements. For example, an identifier is stored in the system data store that identifies that the set of network requirements has been published in the system data store and is ready to be processed by one or more application agents. As the set of network requirements is processed by an application agent and other agents, the status identifier may be updated by an application agent or other agents to provide an update of the status of achieving/completing the corresponding requirements.

Figure 2B:
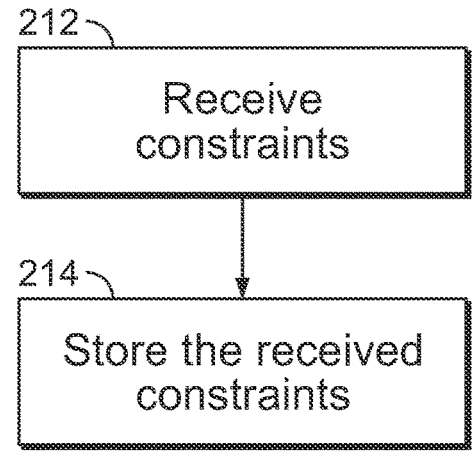
FIG. 2B is a flowchart illustrating an embodiment of a process for processing constraints.

FIG. 2B is a flowchart illustrating an embodiment of a process for processing constraints. The process of FIG. 2B may be implemented on management server 102 of FIG. 1. In some embodiments, the process of FIG. 2B is performed by interaction agent 112 of FIG. 1.

At 212, constraints are received. In some embodiments, one or more constraints are received from a user via an interface. For example, constraints (e.g., resources available, policies to follow, etc.) are received at the interaction agent via a user interface (e.g., web interface, application interface, command line interface, application programming interface (API), RESTful API, configuration file interface, etc.). In some embodiments, the constraints have been automatically determined. For example, the constraints include a list of network switches available and the available resources have been automatically discovered. In some embodiments, the constraints include information identifying resources. For example, identification information about hardware and/or software resources available to be utilized to determine an output declarative requirement is received. In some embodiments, the constraints include specification of one or more policies. For example, a policy specification of how to determine an output requirement is specified by a policy constraint (e.g., how to assign device names, how to assign port mappings, etc.). In some embodiments, the policy constraint may include one or more rules, logic, program code, and/or mappings that at least in part specify how to determine an output from an input declarative requirement. In some embodiments, the constraints may be utilized together with an input declarative requirement by an application agent to determine an output requirement for at least one processing stage/level of a plurality of processing stages/levels of the application agent. In some embodiments, the received constraint is associated with at least one specific processing stage/level.

At 214, the received constraints are stored. In some embodiments, storing the received constraints includes publishing the constraints to a system data store. For example, the constraints are published to data store 104 of FIG. 1. In some embodiments, publishing the constraints includes storing the constraints in the system data store to allow an application agent to read and access the published constraints for use during one or more processing stages/levels. Thus, rather than directly communicating the constraints to the application agent, the interaction agent publishes the set of requirements to the storage to communicate the information to the application agent. In some embodiments, publishing the constraints includes selecting one or more application agents that are to receive appropriate constraints. For example, there exists a plurality of different application agents and each application agent performs a different type of processing and/or processing for a different processing stage/level. In another example, the same and/or different application agents may perform each processing stage/level of a plurality of linked processing stages/levels. In some embodiments, publishing the constraints includes selecting one or more processing stages/levels that will be utilizing one or more appropriate constraints. In some embodiments, the received constraints are modified prior to being published. For example, the received constraints are translated into a form that can be published to a data store. In another example, additional constraints determined to be required for processing are added. In another example, one or more constraints determined to be not required are removed.

Figure 3A:
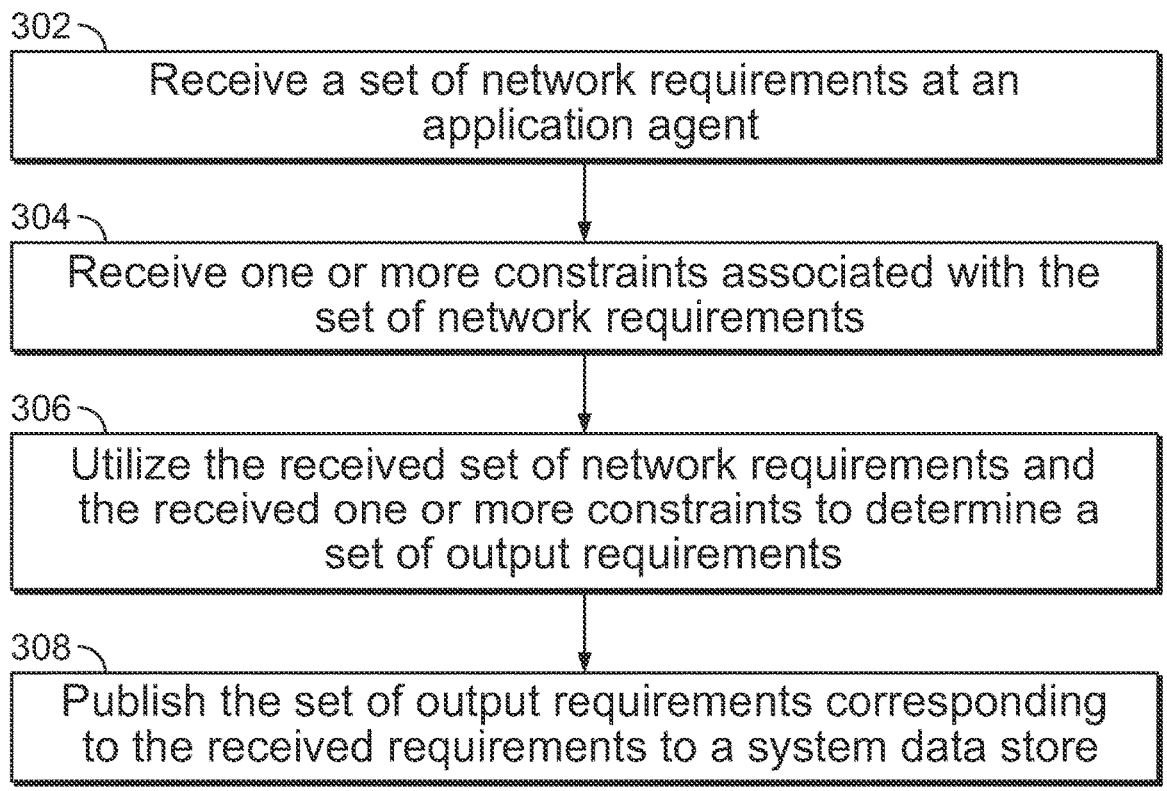
FIG. 3A is a flowchart illustrating an embodiment of a process for publishing device requirements.

FIG. 3A is a flowchart illustrating an embodiment of a process for publishing device requirements. The process of FIG. 3A may be implemented on management server 102 of FIG. 1. In some embodiments, the process of FIG. 3A is performed by application agent 114 of FIG. 1. In some embodiments, the process of FIG. 3A is performed for each set of network requirements to be processed by one or more application agents. In some embodiments, the process of FIG. 3A is performed for each declarative requirement processing stage/level of a plurality of successive processing stages/levels.

At 302, a set of network requirements is received at an application agent. In some embodiments, the application agent is application agent 114 of FIG. 1. In some embodiments, the application agent is a software and/or hardware component that manages desired requirements, configurations, and status updates across various network devices. For example, the application agent provides instructions to and receives status information from various devices of a network being managed. In some embodiments, different types of application agents that perform different functions may exist. For example, network requirements are provided to a specific application agent by matching the requirements to the specific functionality of the specific application agent.

In some embodiments, the received set of requirements is the set of requirements published in 204 of FIG. 2A. In some embodiments, receiving the set of network requirements includes receiving an indication that the set of requirements has been stored in a data store for the application agent. For example, a system data store such as data store 104 of FIG. 1 includes a data record where data for the application agent can be published and/or the system data store recognizes where a published data should be routed based on an included identifier. Each different application agent may subscribe to one or more data records of the system data store and/or subscribe to one or more identifiers that identify content to be routed to the subscribed application agent. In one example, the system data store includes a different data record for each different application agent and the each application agent subscribes to at least its corresponding data record. In another example, each application agent subscribes to an identifier and the system data store routes published data with the identifier to the subscribed application agent.

In some embodiments, by subscribing to a data record, the application agent may be provided a notification by the data storage in the event data is published to a subscribed data record and/or includes a subscribed data identifier. In some embodiments, by subscribing to a data record and/or a data identifier, the application agent may be automatically provided/sent any data published to the subscribed data record and/or identified by the data identifier. In some embodiments, the receiving the set of network requirements includes receiving an indication that the set of network requirements of interest has been stored in the data store and the application agent requests and obtains the set of network requirements of interest. For example, the set of network requirements for a specific processing stage/level to be processed by the application agent is received. In some embodiments, the receiving the set of network requirements includes automatically receiving content of the set of network requirements subscribed by the application agent. In some embodiments, receiving the set of requirements includes directly receiving the set of requirements from an interaction agent.

In some embodiments, the set of requirements is a set of declarative requirements that specify a desired configuration, a desired action, a desired mapping result, a command, or any other desired result of a declarative requirement processing stage/level. In some embodiments, the set of declarative requirements has been specified for a selected processing stage/level. For example, there exists a plurality of successive processing stages/levels that successively require more specific/lower level declarative requirements at each lower level and a user may specify declarative requirements for any one of the stages/levels. In some embodiments, the set of requirements was not completely specified by a user and the received set of requirements includes a default declarative requirement that is consistent with user specified declarative requirements.

At 304, one or more constraints associated with the set of network requirements are received. For example, constraints (e.g., resources available, policies to follow, etc.) that are to be utilized with the received set of requirements to determine an output are identified and received. In some embodiments, the one or more constraints have been identified based at least in part on a processing stage/level associated with the set of network requirements to be processed by the application agent. In some embodiments, the received set of constraints is the set of constraints stored in 214 of FIG. 2B.

At 306, the received set of network requirements and the received one or more constraints are utilized to determine a set of output requirements. For example, the received set of input requirements and the received one or more applicable constraints are utilized to determine a lower level of output declarative requirements. In some embodiments, the received set of network requirements is a set of declarative requirements that are to be processed using the one or more constraints to ultimately determine a set of declarative device requirements for one or more devices to be configured to implement a desired network. In some embodiments, a linear progression of one or more processing stages/levels is followed to determine a final output set of declarative requirements. In some embodiments, a directed graph progression of one or more processing stages/levels is utilized to determine a final output set of declarative requirements. For example, a workflow processing order of a directed acyclic graph of one or more processing stages/levels is followed to determine the final output set of declarative requirements.

In one example, the set of requirements to establish the L3 Clos network configuration described previously is received at the application agent and the application agent analyzes the received requirements and determines and identifies devices that will be utilized to implement the desired network configuration of the received network requirements. The example L3 Clos network requirements specify the number of spine network switch devices to be 16 and the number of leaf network switch devices to be 128. In total, the application agent will determine and identify 144 devices that will need to be configured to implement the desired Clos network. For each of the devices that are to be utilized, the application agent determines the individual device requirements in implementing the desired Clos network. The individual device requirements may be stored in a corresponding system data store entry for each device. For example, the application agent publishes the individual device requirements in 144 different data entries of the data store and each proxy agent of each device accesses these data entries to receive the corresponding device requirements. For the L3 Clos network example, below is one example of device requirements for one of the 144 different device requirements.

Role=spine
IP address=10.0.0.3
Neighbors=[(Leaf-1, 10.0.0.7), (Leaf-2, 10.0.0.15), . . . (Leaf-128, 10.0.0.176)]
Status=defined The above device requirements specify that in a Clos network, one network switch device is to be a spine switch with a BGP router identifier defined as IP address 10.0.0.3. The leaf switches connected to this spine switch device have been also identified.

In some embodiments, the processing performed in 306 includes performing processing for at least one processing stage/level of a plurality of successive declarative requirement processing stages/levels. For example, a processing for one processing stage/level is performed using the application agent and the output declarative requirement of this process level is published to a data store for use as an input declarative requirement for the next processing stage, if applicable. In another example, the application agent performs processing for a processing stage/level that utilizes the received set of network requirements as an input and also performs processing for subsequent lower level processing stages/levels that each utilize output declarative requirements of a previous higher level processing stage/level as its input declarative requirements until a last processing stage/level determines a set of declarative device requirements for one or more devices to be configured to implement a desired network. If a declarative requirement is not specified for a particular processing stage/level, the required input declarative requirement for the processing stage/level may be determined automatically based on the received declarative requirements (e.g., to be consistent) and/or a default declarative requirement for the processing stage/level is utilized.

In some embodiments, utilizing the one or more constraints includes utilizing information identifying resources to assign a configuration to/from hardware/software resources. For example, devices to be configured are selected from a list of device resources. In another example, a configuration parameter is selected from a list of available configuration parameter ranges. In some embodiments, utilizing the constraint includes utilizing a specification of one or more policies. For example, a policy specification of how to determine the output requirement from the input requirements is specified by a policy (e.g., how to assign device names, how to assign port mappings, etc.). In some embodiments, a policy includes one or more rules, logic, program code, and/or mappings that at least in part specify how to determine the output declarative requirements from the input declarative requirements.

In some embodiments, the application agent utilized to determine the output requirements is configurable/customizable. For example, a user may modify, extend, and/or configure the processing performed by the application agent and/or define the entire application agent. The application agent may be configurable/customizable via an interface such as an API.

In some embodiments, the set of output requirements is verified. In some embodiments, verifying the set of output requirements includes performing one or more tests to determine whether the set of output requirements is valid and matches an intent of input requirement(s). In some embodiments, the test to be performed may depend on the processing stage/level of the set of output requirements, content of the input requirements, content of the output requirements, the application agent utilized, one or more constraints utilized, and/or processing performed to determine the output declarative requirements.

In some embodiments, the final processing stage/level of the plurality of processing stages/levels generates the set of output requirements that includes requirements for one or more devices (e.g., devices determined and selected by device type, capability, quantity required, processing capability, etc. required to implement received requirements) that will be utilized to implement the desired network of the input requirements. For each of the one or more devices that are to be configured, individual device requirements may be determined. In some embodiments, the device requirements for each individual device are declarative requirements. For example, the device requirements include a specification of a desired configuration, setting, and/or other specifications of a network device.

At 308, the set of output requirements (e.g., device requirements) corresponding to the received requirements is published to a system data store. In some embodiments, the set of output requirements is to be utilized as input requirements for a next processing level and is published to be provided to an application agent to process the next processing stage/level. In some embodiments, the set of output requirements includes device requirements for one or more devices that are to be configured to implement the received network requirements. For example, the application agent analyzes the received network requirements and determines (e.g., using one or more processing stages/levels) one or more devices (e.g., devices determined and selected by device type, capability, quantity required, processing capability, etc. required to implement received requirements) that will be utilized to implement the received network requirements. For each of the one or more devices that are to be configured, the application agent determines its individual device requirements.

In some embodiments, the device requirements for each individual device are declarative requirements. For example, the device requirements include a specification of a desired configuration, setting, and/or other specifications of a network device. The declarative requirements express a desired configuration of a network device without specifying an exact native device configuration and control flow instructions. By utilizing declarative requirements, what should be accomplished in the network device is specified rather than exact native hardware instructions. By utilizing declarative requirements rather than imperative instructions, the application agent is relieved of the burden of determining the exact device programming and configuration syntax required to achieve a desired result. For example, it is often difficult and burdensome for a user to know the exact imperative syntax and configuration paradigm to configure each device of a network when various different types of devices from different vendors may be utilized and interchanged dynamically on the network.

In some embodiments, publishing the set of output requirements includes storing the output requirements in a system data store (e.g., data store 104 of FIG. 1) to allow one or more application agents and/or proxy agents to read and access the published set of requirements. Thus rather than directly communicating the device requirements to another application agent or one or more selected devices that will be utilized to implement the desired network, the application agent publishes the device requirements to the system storage to communicate the information.

In some embodiments, publishing the set of output requirements includes selecting one or more application/proxy agents that are to receive applicable requirements. For example, there exists a plurality of different proxy agents that are each assigned to a different device of the network. In order to achieve and implement the desired network requirements, the corresponding device requirements may need to be routed to the appropriate proxy agents for further processing. The device requirements to be received by each appropriate application/proxy agent may be published to different storage locations of the system data store corresponding to the appropriate application/proxy agent. For example, the system data store includes different data records corresponding to each different application/proxy agent and appropriate requirements may be communicated to a corresponding proxy agent by publishing the appropriate requirements to the corresponding data record of the desired application/proxy agent.

In some embodiments, requirements for an application agent are published using an identifier that identifies the application agent that is receiving the requirements. In some embodiments, publishing the requirements includes storing/creating an identifier in the system data store. In some embodiments, a status identifier may be updated by the application agent as the requirements are achieved/completed. For example, an identifier is stored in the system data store that identifies that the requirements for an application agent have been published in the system data store and are ready to be processed by an appropriate application agent (e.g., set in "defined" state). As the requirements are processed by the application agent, the status identifier may be updated by the application agent to provide an update of the status of completing the processing stage of the requirements.

In some embodiments, device requirements for each device/proxy agent are published using an identifier that identifies the device/proxy agent that is receiving the corresponding device requirements. In some embodiments, publishing the device requirements includes storing/creating an identifier in the system data store for each device requirement of devices to be utilized to implement the received network requirements. The published "Status" device requirement in the previous L3 Clos network example specifies a status of achieving the device requirement. This status identifier may be updated by a proxy agent of the network switch device as the device requirements are achieved/completed. For example, an identifier is stored in the system data store that identifies that the device requirements for a device have been published in the system data store and are ready to be processed by an appropriate proxy agent (e.g., set in "defined" state). As the device requirements are processed by the proxy agent, the status identifier may be updated by the proxy agent to provide an update of the status of achieving the device requirements.

Figure 3B:
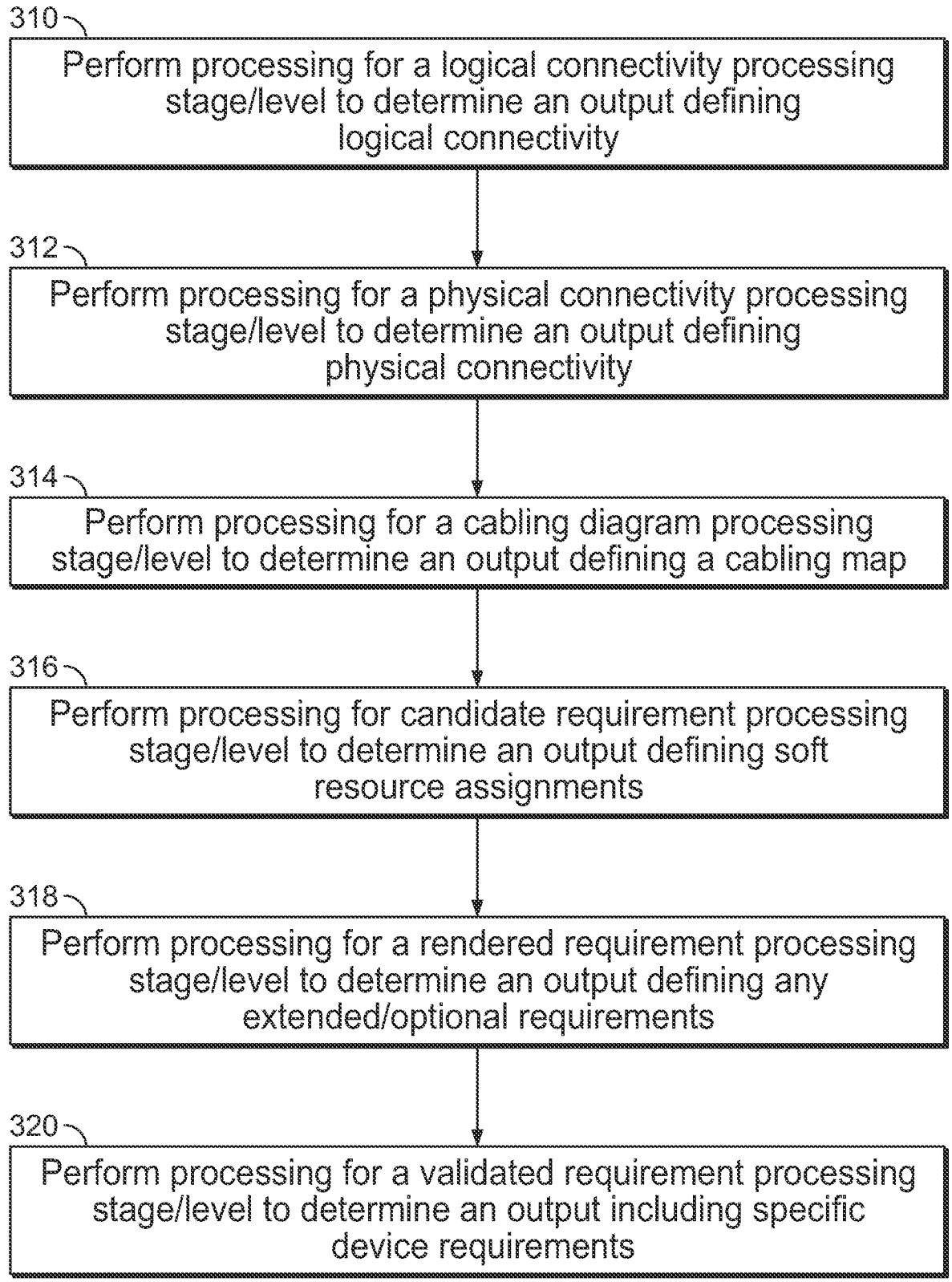
FIG. 3B is a flowchart illustrating an embodiment of an example process for automatically configuring a network using received declarative requirements.

FIG. 3B is a flowchart illustrating an embodiment of an example process for automatically configuring a network using received declarative requirements. The process of FIG. 3B may be implemented on management server 102 of FIG. 1. In some embodiments, the process of FIG. 3B is performed at least in part by one or more different application agents such as application agent 114 of FIG. 1. For example, each processing stage/level may be performed by the same application agent or by different application agents. In some embodiments, at least a portion of the process of FIG. 3B is included in 306 of FIG. 3A. In some embodiments, the process of FIG. 3B is utilized to automatically configure an L3 Clos network. For example, the process of FIG. 3B is utilized to configure an L3 Clos network for a specific network domain and network point of delivery (i.e., PoD).

In some embodiments, the process of FIG. 3B may be flexibly started/entered at any of the steps of the process depending upon a level of input declarative requirements provided by a user. In some embodiments, after declarative requirements to configure a network are received (e.g., received at 202 of FIG. 2A), the processing stage/level of the declarative requirement processing stages/levels corresponding to the received declarative requirements is determined (e.g., declarative requirements are published in 204 of FIG. 2A for the specific application agent to process the declarative requirement for the identified processing stage/level). For example, the received declarative requirements are analyzed to determine the level/type of requirements specified in the received declarative requirements and the processing stage/level of a plurality of processing stages/levels corresponding to the received declarative requirements is identified. In some embodiments, it is determined which step (e.g., which one of steps 310 to 320) of the process of FIG. 3B corresponds to the identified processing stage/level and the process of FIG. 3B is entered/started at the determined step.

At 310, processing for a logical connectivity processing stage/level is performed to determine an output defining logical connectivity. In some embodiments, the logical connectivity is determined at a processing stage/level of a plurality of declarative requirement processing stages/levels. In some embodiments, processing the logical connectivity processing stage/level includes determining output declarative requirements using input declarative requirements. In some embodiments, the input declarative requirements are at least in part received in 302 of FIG. 3A. In some embodiments, processing the logical connectivity processing stage/level includes determining output declarative requirements identifying logical connections between leaf network switches and spine network switches to implement input declarative requirements defining a desired L3 Clos network. The input declarative requirements of this processing stage/level may specify one or more of the following: the number of servers to be connected using the L3 Clos network to be established; and the oversubscription ratio (e.g., maximum amount of bandwidth theoretically that could be required for a network switch port vs. actual maximum bandwidth capacity of the network switch port). In some embodiments, constraints are obtained (e.g., obtained in 304 of FIG. 3A) and utilized (e.g., utilized in 306 of FIG. 3A) to determine the output declarative requirements. For example, profiles (e.g., number of switch-facing ports, number of server-facing ports, etc.) of devices (e.g., network hardware switches) available to be utilized to create the L3 Clos network (e.g., without identifying specific exact machine) are obtained and utilized in selecting the types of devices to be utilized in the output declarative requirement identifying the mesh network. In some embodiments, only devices identified in the constraints may be the switches identified in the output declarative requirements.

In some embodiments, the input declarative requirements of the logical connectivity processing stage/level include one or more declarative requirements provided by a user. For example, the input declarative requirements of the logical connectivity processing stage/level include declarative requirements received in 202 of FIG. 2A. In some embodiments, at least a portion of the input declarative requirements has not been directly specified by a user and a default and/or dynamically determined declarative input requirement is utilized. The dynamically determined declarative input requirement may be determined to be consistent with at least in part a user provided input declarative requirement. In some embodiments, step 310 is not performed in the event a user provided a lower/later level/stage of input declarative requirements. For example, the process of FIG. 3B is entered at 312. In some embodiments, the output declarative requirements are verified to ensure performance expectations and/or an intent of the input declarative requirements is met. In some embodiments, the output declarative requirements are verified to verify the number and/or type of network switches utilized and/or devices utilized in the output declarative requirements.

At 312, processing for a physical connectivity processing stage/level is performed to determine an output defining a physical connectivity. In some embodiments, the transformation from a logical connectivity to a physical connectivity involves assigning switch models to the logical devices and performing validation to ensure that the selected switch models have the necessary prerequisites (such as number of ports with specific line rates) to participate in the network configuration. In some embodiments, the physical connectivity processing stage/level is one of a plurality of declarative requirement processing stages/levels. In some embodiments, processing the physical connectivity processing stage/level includes determining output declarative requirements using input declarative requirements. The input declarative requirements of this processing stage/level may be the output declarative requirements of the processing stage/level of 310. In some embodiments, the input declarative requirements are at least in part received in 302 of FIG. 3A. In some embodiments, processing the physical connectivity processing stage/level includes determining an output declarative requirement identifying physical connections between specific device types corresponding to logical connections specified in the input declarative requirements. In some embodiments, constraints are obtained (e.g., obtained in 304 of FIG. 3A) and utilized (e.g., utilized in 306 of FIG. 3A) to determine the output declarative requirements. For example, profiles of specific device types (e.g., specific model/vendor of network hardware switches) available to be utilized to create the L3 Clos network are obtained and utilized in selecting the specific device types to be utilized in the output declarative requirement identifying the L3 Clos mesh network. In some embodiments, specific device types are assigned to logical devices of the input declarative requirements to determine the output declarative requirements for this processing stage.

In some embodiments, the input declarative requirements of the physical connectivity processing stage/level include one or more declarative requirements provided by a user. For example, the input declarative requirements of the physical connectivity processing stage/level include declarative requirements received in 202 of FIG. 2A. In some embodiments, at least a portion of the input declarative requirements has not been directly specified by a user and a default and/or dynamically determined declarative input requirement is utilized. The dynamically determined declarative input requirement may be determined to be consistent with at least in part a user provided input declarative requirement. In some embodiments, step 312 is not performed in the event a user provided a lower/later level/stage of input declarative requirements than the level of the physical connectivity processing stage/level. For example, the process of FIG. 3B is entered at 314. In some embodiments, the output declarative requirements are verified to ensure correct route tables are consistent with the input declarative requirements. In some embodiments, the output declarative requirements are verified to verify route tables and/or specific device types included in the output declarative requirements.

At 314, processing for a cabling diagram processing stage/level is performed to determine an output defining a cabling diagram/map. In some embodiments, the cabling diagram processing stage/level is one of a plurality of declarative requirement processing stages/levels. In some embodiments, processing the cabling diagram processing stage/level includes determining output declarative requirements using input declarative requirements. The input declarative requirements of this processing stage/level may be the output declarative requirements of the processing stage/level of 312. In some embodiments, the input declarative requirements are at least in part received in 302 of FIG. 3A. In some embodiments, processing the cabling diagram processing stage/level includes determining an output declarative requirement identifying a cabling diagram/map defining connections between ports of L3 Clos switches specified in the input declarative requirements. In some embodiments, constraints are obtained (e.g., obtained in 304 of FIG. 3A) and utilized (e.g., utilized in 306 of FIG. 3A) to determine the output declarative requirements. For example, constraints of port maps/identifications and port resources of specific devices (e.g., network hardware switches) to be utilized to create the L3 Clos network are obtained and utilized in determining the specific cable connections between ports of the switches of the L3 Clos mesh network. In some embodiments, various roles (e.g., server facing, spine, edge, etc.) are assigned for specific ports in determining the output declarative requirements for this processing stage. In some embodiments, one or more policy/rule/code constraints are utilized in determining the cabling diagram output declarative requirement.

In some embodiments, the input declarative requirements of the cabling diagram processing stage/level include one or more declarative requirements provided by a user. For example, the input declarative requirements of the cabling diagram level include declarative requirements received in 202 of FIG. 2A. In some embodiments, at least a portion of the input declarative requirements has not been directly specified by a user and a default and/or dynamically determined declarative input requirement is utilized. The dynamically determined declarative input requirement may be determined to be consistent with at least in part a user provided input declarative requirement. In some embodiments, step 314 is not performed in the event a user provided a lower/later level/stage of input declarative requirements than the level of the cabling diagram processing stage/level. For example, the process of FIG. 3B is entered at 316. In some embodiments, the output declarative requirements are verified to ensure correct cabling and/or port (e.g., port function) mappings.

At 316, processing for a candidate requirement processing stage/level is performed to determine an output defining soft resource assignments. In some embodiments, the candidate requirement processing stage/level is one of a plurality of declarative requirement processing stages/levels. In some embodiments, processing the candidate requirement processing stage/level includes determining output declarative requirements using input declarative requirements. The input declarative requirements of this processing stage/level may be the output declarative requirements of the processing stage/level of 314. In some embodiments, the input declarative requirements are at least in part received in 302 of FIG. 3A. In some embodiments, processing the candidate requirement processing stage/level includes determining an output declarative requirement identifying assigned soft resources of connections identified in the input declarative requirements. In some embodiments, constraints are obtained (e.g., obtained in 304 of FIG. 3A) and utilized (e.g., utilized in 306 of FIG. 3A) to determine the output declarative requirements. For example, constraints including a listing of soft resources (e.g., IP address ranges, autonomous system number (ASN) ranges, etc.) available to be assigned are utilized in assigning soft resources to the network switch connections. In some embodiments, one or more policy/rule/code constraints are utilized in assigning soft resources specified in the output declarative requirements.

In some embodiments, the input declarative requirements of the candidate requirement processing stage/level include one or more declarative requirements provided by a user. For example, the input declarative requirements of the candidate requirement level include declarative requirements received in 202 of FIG. 2A. In some embodiments, at least a portion of the input declarative requirements has not been directly specified by a user and a default and/or dynamically determined declarative input requirement is utilized. The dynamically determined declarative input requirements may be determined to be consistent with at least in part a user provided input declarative requirement. In some embodiments, step 316 is not performed in the event a user provided a lower/later level/stage of input declarative requirements than the level of the candidate requirement processing stage/level. For example, the process of FIG. 3B is entered at 318. In some embodiments, the output declarative requirements are verified to ensure correct IP assignments, ASNs, Border Gateway Protocol (BGP) sessions, etc. Although ASN examples have been described, other reference architectures and routing protocols may be utilized in various embodiments. For example, a different routing protocol such as Open Shortest Path First (OSPF) that does not require ASNs may be utilized.

At 318, processing for a rendered requirement processing stage/level is performed to determine an output defining any extended/optional requirements. In some embodiments, the rendered requirement processing stage/level is one of a plurality of declarative requirement processing stages/levels. In some embodiments, processing the rendered requirement processing stage/level includes determining output declarative requirements using input declarative requirements. The input declarative requirements of this processing stage/level may be the output declarative requirements of the processing stage/level of 316. In some embodiments, the input declarative requirements are at least in part received in 302 of FIG. 3A. In some embodiments, processing the rendered requirement processing stage/level includes determining an output declarative requirement identifying final configurations including any extended/optional requirements/configurations of the L3 Clos network to be established. In some embodiments, constraints are obtained (e.g., obtained in 304 of FIG. 3A) and utilized (e.g., utilized in 306 of FIG. 3A) to determine the output declarative requirements. For example, a specification of extended/optional configurations (e.g., configurations to be added/substituted from candidate configurations, parameters, etc.) to be assigned for specific types of devices is utilized in determining extended/optional requirements/configurations of the final requirements specified in the output declarative requirements. In some embodiments, one or more policy/rule/code constraints are utilized in determining the rendered requirement output declarative requirements.

In some embodiments, the input declarative requirements of the rendered requirement processing stage/level include one or more declarative requirements provided by a user. For example, the input declarative requirements of the rendered requirement level include declarative requirements received in 202 of FIG. 2A. In some embodiments, at least a portion of the input declarative requirements has not been directly specified by a user and a default and/or dynamically determined declarative input requirement is utilized. The dynamically determined declarative input requirement may be determined to be consistent with at least in part a user provided input declarative requirement. In some embodiments, step 318 is not performed in the event a user provided a lower/later level/stage of input declarative requirements than the level of the rendered requirement processing stage/level. For example, the process of FIG. 3B is entered at 320. In some embodiments, the output declarative requirements are verified to ensure correct final configurations.

In some embodiments, performing processing for the rendered requirement processing stage/level includes identifying and invoking, for each component of the system (e.g., device) to be configured to provide the desired service, a function to generate rendered requirements for the component of the system. In some embodiments, there exists a plurality of different functions that are each specific to a particular reference architecture and system component role within the reference architecture. For example, for each system component to be utilized to provide the intended network service, the rendered requirement to configure the system component is generated by a particular program function that is specific to the reference architecture and role of the system component. In some embodiments, in order to support a new reference architecture, a separate function for each possible role (e.g., device type) within the reference architecture is to be provided such that the function can be located and invoked to implement the reference architecture when needed.

At 320, processing for a validated requirement processing stage/level is performed to determine an output including specific device requirements. In some embodiments, the validated requirement processing stage/level is the final processing stage/level of a plurality of declarative requirement processing stages/levels. In some embodiments, processing the validated requirement processing stage/level includes determining output declarative requirements using input declarative requirements. The input declarative requirements of this processing stage/level may be the output declarative requirements of the processing stage/level of 318. In some embodiments, the input declarative requirements are at least in part received in 302 of FIG. 3A. In some embodiments, processing the validated requirement processing stage/level includes determining an output declarative requirement assigning final configurations to specific network devices to be configured to implement the L3 Clos network. In some embodiments, constraints are obtained (e.g., obtained in 304 of FIG. 3A) and utilized (e.g., utilized in 306 of FIG. 3A) to determine the output declarative requirements. For example, constraints including a specification of specific device profiles, availability of specific actual devices, and/or unique identifiers (e.g., serial numbers) of specific devices are received to determine specific device/switch assignments to be specified in the output declarative requirements. In some embodiments, one or more policy/rule/code constraints are utilized in assigning specific devices assigned in the validated requirement output declarative requirements.

In some embodiments, the input declarative requirements of the validated requirement processing stage/level include one or more declarative requirements provided by a user. For example, the input declarative requirements of the rendered requirement level include declarative requirements received in 202 of FIG. 2A. In some embodiments, at least a portion of the input declarative requirements has not been directly specified by a user and a default and/or dynamically determined declarative input requirement is utilized. The dynamically determined declarative input requirements may be determined to be consistent with at least in part a user provided input declarative requirement. In some embodiments, step 320 is not performed in the event a user provides final validated requirements identifying specific devices. In some embodiments, the output declarative requirements are verified to ensure correct specific device assignments. In some embodiments, the output declarative requirements are to be pushed to specific proxy agents to configure specific devices/switches. For example, the output declarative requirements of this stage/level are received at 402 of FIG. 4.

In some embodiments, processing in 318 and/or 320 includes identifying and invoking for each system component (e.g., node, device, etc.) to be configured to provide the desired service, a configuration/service rendering program function to generate rendered/output requirements for the component. In some embodiments, there exists a plurality of different functions that are each specific to a particular reference architecture and system component role within the reference architecture. For example, for each system component to be utilized to provide the intended network service, the rendered/output requirement to configure the system component is generated by a particular program function that is specific to the reference architecture and role of the system component. In some embodiments, in order to support a new reference architecture, a separate function for each possible role (e.g., device type) within the reference architecture is to be provided such that the function can be located and invoked to implement the reference architecture when needed.

In some embodiments, processing in 318 and/or 320 includes identifying and invoking, for each component of the system (e.g., node, device, etc.) to be configured to provide the desired service, a verification model rendering function to generate a verification model for the component of the system. In some embodiments, there exists a plurality of different functions that are each specific to a particular reference architecture and system component role within the reference architecture to generate a corresponding verification model. For example, for each system component to be utilized to provide the intended network service, the verification model is generated by a particular program function (e.g., verification model rendering function is different from the service rendering function that generates the rendered/output requirements for the system component) that is specific to the reference architecture and role of the system component.

Although a simple linear progression of processing stages/levels has been shown in the example of FIG. 3B, in a different example, a directed graph progression of one or more processing stages/levels is utilized to determine final output declarative requirements. For example, a workflow processing order of a directed acyclic graph of one or more processing stages/levels is followed to determine the final output set of declarative requirements.

Figure 3C:
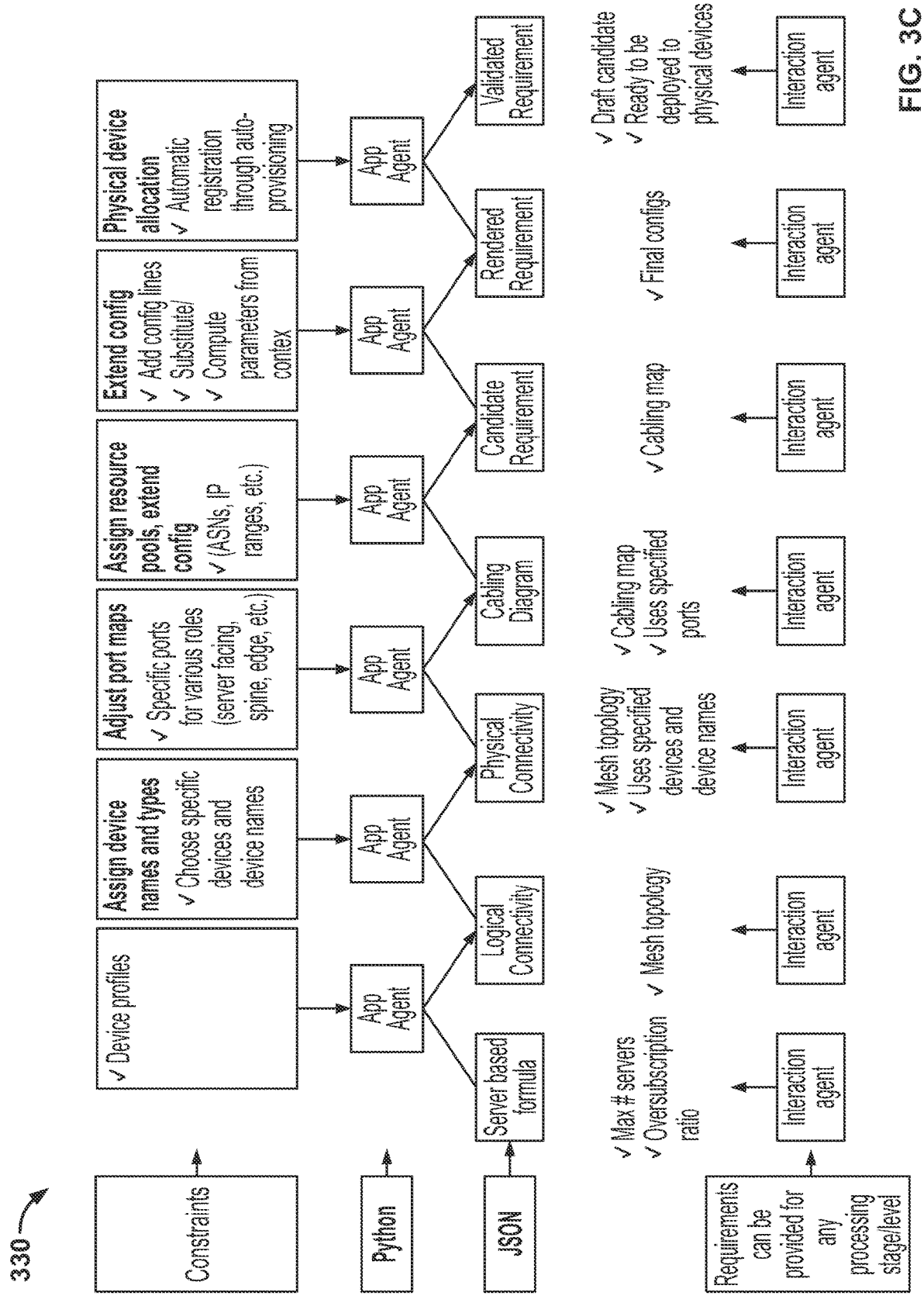
FIG. 3C is a block diagram illustrating processing stages/levels of an example process for automatically configuring an L3 Clos network.

FIG. 3C is a block diagram illustrating processing stages/levels of an example process for automatically configuring an L3 Clos network. The processing shown in FIG. 3C may be implemented on management server 102 of FIG. 1. In some embodiments, the processing shown in FIG. 3C is performed at least in part by one or more different application agents such as application agent 114 of FIG. 1. In some embodiments, the processing shown in FIG. 3C is included in 306 of FIG. 3A. In some embodiments, FIG. 3C illustrates the process of FIG. 3B. In some embodiments, a user is able to flexibly enter the processing shown in FIG. 3C at any one of the successive processing stages/levels depending on a level of input declarative requirements provided by a user. As shown in diagram 330, output declarative requirements of a previous/higher level stage are utilized by an application agent of the next lower level as its input declarative requirements. The application agents utilize the input declarative requirements along with predefined input constraints to determine the output declarative requirements.

Figure 4:
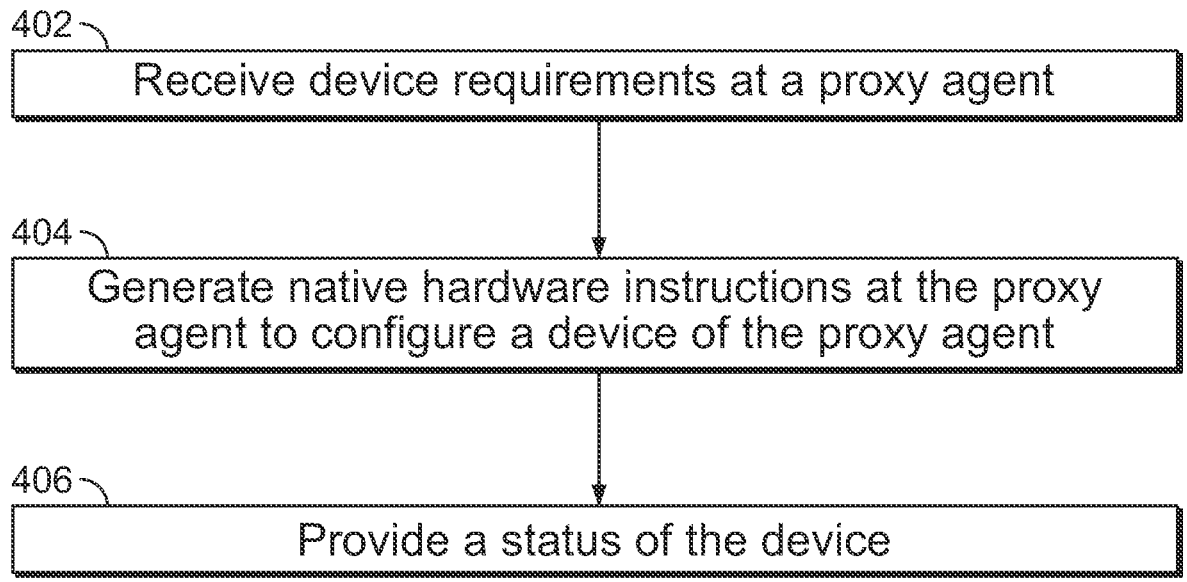
FIG. 4 is a flowchart illustrating an embodiment of a process for generating native hardware instructions.

FIG. 4 is a flowchart illustrating an embodiment of a process for generating native hardware instructions. The process of FIG. 4 may be implemented on network device 106 and/or 108 of FIG. 1. In some embodiments, the process of FIG. 4 is performed by proxy agent 116 and/or 118 of FIG. 1.

At 402, device requirements are received at a proxy agent. In some embodiments, the proxy agent is proxy agent 116 or 118 of FIG. 1. In some embodiments, the proxy agent is a software and/or hardware component that manages and implements device requirements for an associated/assigned device. In some embodiments, different types/versions of proxy agents exist for different network devices. For example, a proxy agent provides conversion functionality between a device requirement and implementing native instructions specific to a device and the proxy agent that can generate native instructions for a specific device (e.g., specific to vendor, operating system, protocol, version, etc. of the device) is selected for the specific device. By separating functionality between the interaction agent, application agent, and proxy agent, only the proxy needs to handle specific native instructions of a device. Thus, when a new type or version of a device is added to a network, only a new proxy agent for the new device is required while the interaction agent and application agent may remain unchanged. This may allow simplified administration of various different types of devices of a network. The proxy agent may be installed on a device managed by the proxy agent. In some embodiments, the proxy agent is remote from the managed device. In some embodiments, one proxy agent may manage a plurality of devices. For example, a single proxy agent may manage a plurality of devices of the same type. In some embodiments, the device-specific instructions are generated at a server and provided to the proxy agent that is responsible for applying the provided instructions on the device and reporting the status of applying the provided instructions.

In some embodiments, the received device requirements are the device requirements published in 308 of FIG. 3A for a device of the proxy agent. In some embodiments, receiving the device requirements includes receiving an indication that the device requirements have been stored in a system data store for the proxy agent of a specific device. For example, a system data store such as data store 104 of FIG. 1 includes a data record where data for the proxy agent can be published. Each different proxy agent may subscribe to one or more data records of the system storage that correspond to a device being managed by the respective proxy agent. For example, the system data store includes a different data record for each device of the network and the each proxy agent subscribes to the corresponding data record of its assigned device. In some embodiments, each different proxy agent subscribes with the system data store one or more identifiers that identify the device associated with the corresponding proxy agent. For example, any published data identified by the subscribed identifier is notified to the subscribed proxy agent. In some embodiments, by subscribing to a data record and/or an identifier, the proxy agent may be provided a notification by the data store in the event data is published to the subscribed data record and/or data associated with the identifier has been published. In some embodiments, by subscribing to a data record and/or an identifier, the proxy agent may be automatically provided/sent any data published to the subscribed data record and/or identified by the identifier. In some embodiments, the receiving the device requirements includes receiving an indication that the device requirements have been stored to a data store due to a subscription and the proxy agent requests and obtains the device requirements from the data store. In some embodiments, the receiving the device requirements includes automatically receiving content of device requirements from a data store due to a subscription. In some embodiments, receiving the device requirements includes directly receiving the device requirements from an application agent.

At 404, native hardware instructions are generated at the proxy agent to configure a device of the proxy agent. In some embodiments, native hardware instructions are generated in a software library and the generated native hardware instructions are utilized by the proxy agent, the application agent, and/or another agent. In some embodiments, the device requirements received by the proxy agent are processed by the proxy agent to generate the native hardware instructions implementing the received device requirements. For example, received declarative instructions are converted to imperative instructions. In some embodiments, the native hardware instructions are in the native programming/configuration syntax of the device. For example, the native hardware instructions are generated in a format native to a configuration software interface of the device. In some embodiments, the native hardware instructions are in a form that can be directly utilized by the device to configure the device. In some embodiments, the native hardware instructions are executed by the device. For example, the generated native hardware instructions are issued for execution on the device.

In one example, the device requirements to become a spine switch of the L3 Clos network configuration described previously in the specification are received at the proxy agent and the proxy agent analyzes the received device requirements and generates native network switch device instructions to configure the network switch device to become a spine switch of a Clos network with the specified BGP router identifier and specified neighbors.

At 406, a status of the device is provided. In some embodiments, step 406 is optional and may not be performed. In some embodiments, providing the status includes publishing an identifier of the status to a system data store (e.g., data store 104 of FIG. 1). In some embodiments, providing the status includes providing an indication of status of achieving the received device requirements. For example, a status indication of a stage of the processing of the device requirements is provided. In some embodiments, providing the status indication includes updating a status identifier in a system data store. For example, a status identifier is updated in data store 104 of FIG. 1 (e.g., allowing the proxy agent to be stateless). In some embodiments, the updated status identifier is the identifier corresponding to the "Status=defined" published in the Clos network device requirement example described previously.

In some embodiments, the status of the device indicates a status of implementing device requirements on the device. For example, the status may be one of six states. The initial first example state is a "defined" state that indicates that the device requirement has been successfully published to a system data store by an application agent. A second example state is a "staged" state that is indicated by a receiving proxy agent that the proxy agent has received the device requirements and has allocated resources to implement the device requirements. A third example state is a "rendered" state that indicates that the proxy agent has generated native hardware instructions corresponding to the device requirements. A fourth example state is a "deployed" state that indicates that the proxy agent has issued the generated native hardware instructions for execution on the device. A fifth example state is an "operational" state that indicates that the generated native hardware instructions are successfully executed on the device. However, when an error is encountered, a sixth example "error" state may be indicated to indicate that an error has been encountered.

In some embodiments, the status of the device indicates a health state of the device. For example, indication of information such as processing load, CPU utilization, storage utilization, memory utilization, version identification, errors encountered, network status, network bandwidth, network latency, etc. may be provided. In some embodiments, the status of the device indicates a packet drop rate. For example, an indication of a Ternary Content Addressable Memory (i.e., TCAM) utilization of the device is provided by the proxy agent. In another example, an indication is provided when a TCAM table is overflowed.

Figure 5:
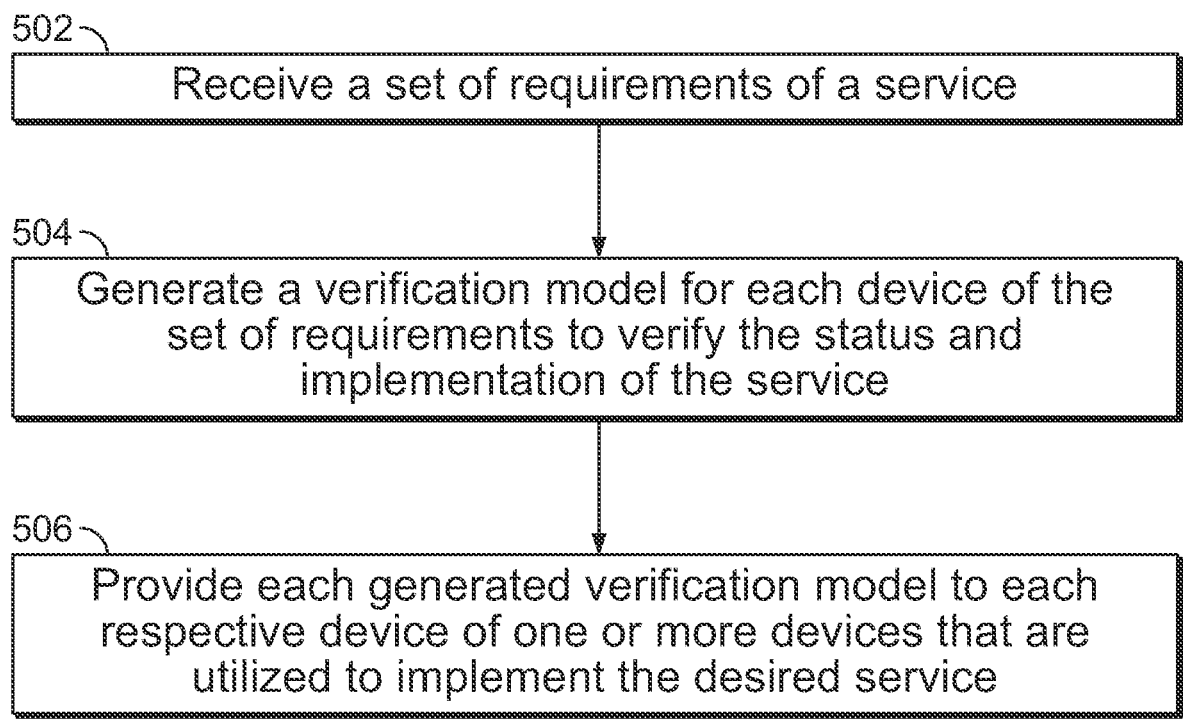
FIG. 5 is a flowchart illustrating an embodiment of a process for generating a verification model.

FIG. 5 is a flowchart illustrating an embodiment of a process for generating a verification model. The process of FIG. 5 may be implemented on management server 102 of FIG. 1.

At 502, a set of requirements of a service is received. In some embodiments, the received set of requirements is the set of network requirements received in 302 of FIG. 3A. The service may be a network service and/or other type of service. In some embodiments, the set of requirements includes a set of declarative requirements. For example, declarative requirements express a desired configuration of network components without specifying an exact native device configuration and control flow. By utilizing declarative requirements, what should be accomplished may be specified rather than how it should be accomplished.

At 504, a verification model for each device of the set of requirements is generated to verify the status and implementation of the service. In some embodiments, generating the verification model includes using the received set of requirements along with one or more received constraints associated with the set of requirements to determine a more complete set of requirements to be utilized to generate one or more verification models and one or more device configurations. For example, the output of step 316 of FIG. 3B is utilized to generate one or more verification models for one or more devices to be utilized to implement the service to be verified. In this example, the output of step 316 is utilized to generate both the specific device requirements to be utilized to configure devices to provide the service (e.g., utilized to generate output of steps 318/320 of FIG. 3B) as well as separate verification models for each of the devices to verify that each device is properly functioning and has been properly configured for the set of requirements. In some embodiments, the received set of requirements has been processed to include information such as a cabling diagram/map using at least a portion of the process of FIG. 3C. For example, the set of requirements received in 502 has been processed to specify topology of connections between network components.

Figure 8C:
FIG. 8C shows a portion of an example device configuration generated to implement at least a portion of received requirements.

FIGS. 8A-8C show examples of JavaScript Object Notation (JSON) code. The syntax of the JSON examples has been simplified to improve readability. In various embodiments, the actual full JSON syntax is utilized. FIG. 8A shows a portion of an example of declarative requirements resulting from the set of requirements received in 502 that has been processed to specify topology of connections between network components. Specification portion 802 shows a portion of a specification file (e.g., showing elements of a JavaScript Object Notation (JSON) file) specifying a desired connection to be created between a leaf node named "leaf_3" and a spine node named "spine_1" of a desired L3 CLOS network. However, specification portion 802 does not specify the exact necessary routing specifications to actually connect node devices.

FIG. 8B shows an example of at least a portion of a verification model (e.g., in JSON format) generated to verify at least a portion of received requirements. In order to verify to the connection specified as desired in section 802, the verification model of FIG. 8B includes a corresponding section 804 that specifies that the corresponding connection is expected to be and should be verified as a Border Gateway Protocol (BGP) connection, associated with the specified IP addresses and autonomous system numbers (ASN) of the source and destination devices, and connected together as a connection "fabric" between a leaf and a spine.

By separately generating and providing to a proxy agent of the device the verification model from the device configuration using the same received set of requirements, the proxy agent may be provided better guidance on device parameters to be verified. In some embodiments, each verification model is to be provided via a respective proxy agent to each respective device utilized to provide the service, and each proxy agent performs telemetry collection by gathering and reporting information on various data channels and parameters of its device based on its provided verification model. For example, each verification model identifies specific parameters for a specific device that should be checked and collected by the proxy agent of the specific device because these parameters are relevant to verifying the service.

FIG. 8C shows a portion of an example device configuration generated to implement at least a portion of received requirements. Configuration portion 820 shown in FIG. 8C has been generated to at least in part instruct a device on how to configure the device to implement the desired service. This may be contrasted to the requirements received in 502 that specify the desired result rather than how to achieve the desired result. Additionally, as contrasted to the verification model (e.g., shown in FIG. 8B) that specifies parameters to be reported/verified, the device configuration of FIG. 8C specifies the actual implementation configuration of the device. In the example shown in FIG. 8C, the corresponding device (e.g., switch/proxy agent) that is to receive the device configuration is configured by writing configuration data to one or more configuration files of the device and executing commands using the written configuration files. Configuration portion 820 identifies that file "/etc/quagga/Quagga-.conf" should be written to include the specified data (e.g., configuration to establish switch routing using Quagga routing software suite) and the Quagga software is commanded using the three specified commands to stop, start, and reload the written file for execution. In some embodiments, when a proxy agent receives the device configuration of FIG. 8C, the proxy agent implements the device configuration at least in part by executing the configuration as instructed by the received device configuration. As shown in the examples, it would be difficult to attempt to verify the implementation of the desired service using various device configurations of the implementing devices (e.g., shown in FIG. 8C) as compared to the more verification specific and simpler verification models (e.g., shown in FIG. 8B).

Returning to FIG. 5, at 506, each generated verification model is provided to each respective device of one or more devices that are utilized to implement the desired service. In some embodiments, providing the generated verification model includes sending the generated verification model to a proxy agent of the respective device. For example, an application agent of management server 102 sends a generated verification model to proxy agent 116 of network device 106 and sends another generated verification model to proxy agent 118 of network device 108 of FIG. 1. In some embodiments, providing each generated verification model includes publishing each generated verification model to a system data store (e.g., data store 104 of FIG. 1) to allow one or more proxy agents to read and access its respective published verification model. Thus rather than directly communicating the verification models to devices, an application agent publishes the verification models to the system storage to communicate the information.

In some embodiments, publishing the verification models includes selecting one or more proxy agents that are to receive applicable requirements. For example, the verification model to be received by each appropriate proxy agent may be published to a different storage location (e.g., different data record) of the system data store corresponding to the appropriate proxy agent. In some embodiments, the verification model for each device/proxy agent is published using an identifier that identifies the device/proxy agent that is receiving the corresponding verification model. In some embodiments, publishing the verification model includes storing/creating a status identifier in the system data store for each device. This status identifier may be updated by a proxy agent as the verification model is processed. In various embodiments, verification may be at least in part performed by a device and/or a server or performed offline against a separate database/data store.

Figure 6:
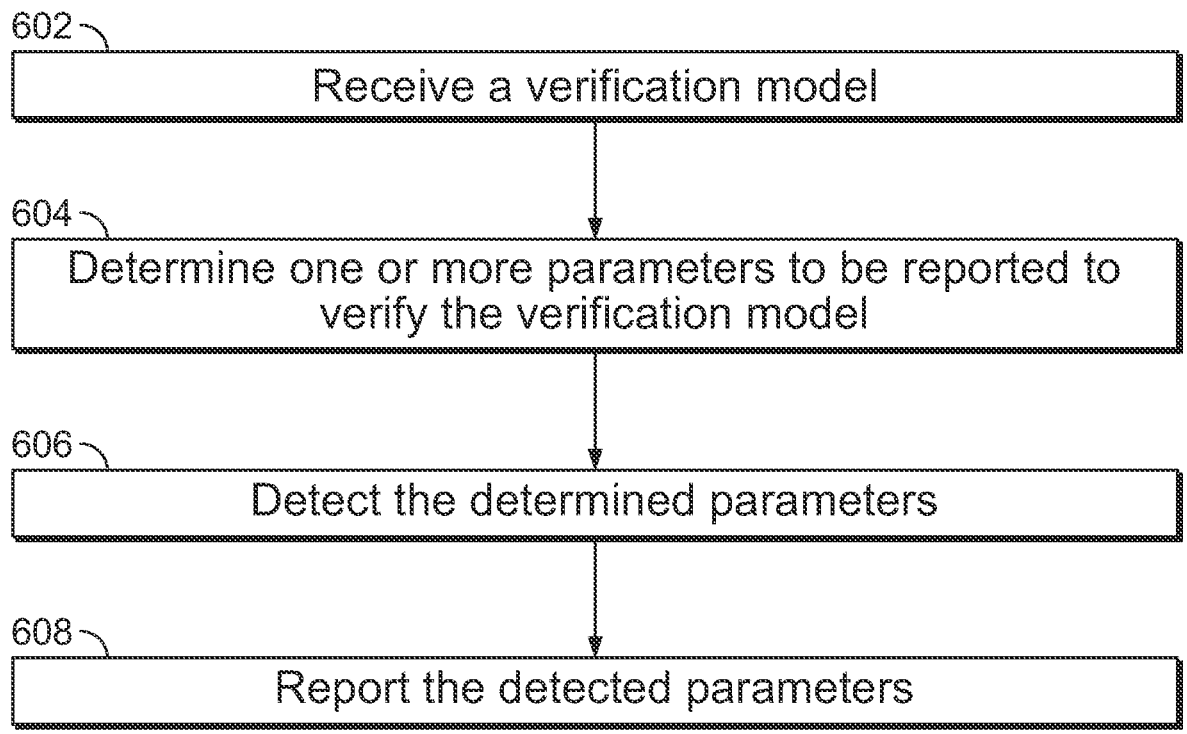
FIG. 6 is a flowchart illustrating an embodiment of a process for detecting status parameters.

FIG. 6 is a flowchart illustrating an embodiment of a process for detecting status parameters. The process of FIG. 6 may be implemented on network device 106 and/or network device 108 of FIG. 1. For example, at least a portion of the process of FIG. 6 is performed by a proxy agent (e.g., proxy agent 116) of network device 106 and/or a proxy agent (e.g., proxy agent 118) of network device 108.

At 602, a verification model is received. In some embodiments, a proxy agent receives a verification model. The proxy agent may be a proxy agent configured to handle the verification using the verification model. This proxy agent may be the same or different from the proxy agent utilized in FIG. 4 to configure the device. In some embodiments, the received verification model is the verification model provided in 506 of FIG. 5. For example, a proxy agent of a device being verified obtains the verification model from an application agent.

In some embodiments, the received verification model is the verification model published in 506 of FIG. 5 for a device of the proxy agent. In some embodiments, receiving the verification model includes receiving an indication that the verification model has been stored in a system data store for the proxy agent of a specific device. For example, a system data store such as data store 104 of FIG. 1 includes a data record where data for the proxy agent can be published. Each different proxy agent may subscribe to one or more data records of the system storage that correspond to a device being managed by the respective proxy agent. For example, the system data store includes a different data record for each device of the network and the each proxy agent subscribes to the corresponding data record of its assigned device. In some embodiments, each different proxy agent subscribes with the system data store one or more identifiers that identify the device associated with the corresponding proxy agent. For example, any published data identified by the subscribed identifier is notified to the subscribed proxy agent. In some embodiments, by subscribing to a data record and/or an identifier, the proxy agent may be provided a notification by the data store in the event a verification model is published to the subscribed data record and/or data associated with the identifier has been published. In some embodiments, by subscribing to a data record and/or an identifier, the proxy agent may be automatically provided/sent any data published to the subscribed data record and/or identified by the identifier. In some embodiments, the receiving the verification model includes receiving an indication that the verification model has been stored to a data store due to a subscription and the proxy agent requests and obtains the verification model from the data store. In some embodiments, the receiving the verification model includes automatically receiving content of the verification model from a data store due to a subscription. In some embodiments, receiving the verification model includes directly receiving the verification model from an application agent.

In some embodiments, the verification model includes a list of one or more connections and associated parameters of the connections, and the associated device/proxy agent of the verification model is to report/verify the existence, status, and/or parameters of the listed connections. For example, specification section 804 of FIG. 8B identifies a BGP connection session that is to be verified and specifies the IP addresses, autonomous system numbers (ASN) of the source and destination devices, and that this BGP connection is to serve as the "fabric" role between a leaf and a spine. These parameters and the status of the specified BGP are to be reported/verified by the receiving device/proxy agent.

In some embodiments, the verification model includes a list of one or more service processes that should be operating on the associated device of the verification model and the associated device/proxy agent is to report/verify the existence, status, and/or parameters of the listed service processes. For example, section 806 of FIG. 8B specifies that a service with the specified parameters providing BGP connections should be operating on the associated device with the specified router_id (e.g., IP address) and ASN.

In some embodiments, the verification model includes a list of one or more IP addresses that should be configured and are operating on the associated device of the verification model and the associated device/proxy agent is to report/verify the existence, status, and/or parameters of the listed IP address. For example, section 808 of FIG. 8B specifies that an IP address with the specified parameters should be operating on the associated device that is serving as the specified "role." The specified "role" in this example may be "server" or "fabric." The "server" role identifies an IP address to be utilized to connect to a server device and the "fabric" role identifies an IP address to be utilized to connect to a network fabric switch (e.g., spine/leaf node of an L3 CLOS network).

In some embodiments, the verification model includes a list of one or more interfaces of the associated device that should be verified and the associated device/proxy agent is to report/verify the existence, status and/or parameters of the listed interfaces. For example, section 810 of FIG. 8B specifies that for an interface of the device identified as "swpt32" (e.g., switch port 32), its status, data counters (e.g., bytes sent/received using the interface), errors encountered, bytes dropped, etc. should be reported/verified.

In some embodiments, the verification model includes a list of one or more connections between interfaces of the associated device and the other connected device that should be configured and operating and the associated device/proxy agent is to report/verify the existence, status, and/or parameters of the listed interface connections. For example, section 812 of FIG. 8B specifies that for an interface of the device identified as "swpt49" (e.g., switch port 49), it should be connected to another device identified as "spine_1" at an interface of "spine_1" identified as "Etherneti1/5."

In some embodiments, the verification model includes a list of one or more device identifications of the associated device and the associated device/proxy agent is to report/verify the existence, status, and/or parameters of the listed device identification. For example, section 814 of FIG. 8B specifies that the device of the verification model should be of a model "Celestica_RedstoneXP," identified as "leaf_3," and should be of a device type "NetworkDevice."

Returning to FIG. 6, at 604, one or more parameters to be reported to verify the verification model are determined. In some embodiments, the verification model identifies the one or more parameters. For example, the verification model includes a list of parameters of interest and a status/verification of each of these parameters that are to be reported. Examples of the parameters and status include parameters/status of connection sessions, services, IP addresses, interfaces, interface connections, device configurations, device properties, ports, quality of service metrics, etc. In some embodiments, the verification model identifies a higher conceptual item to be verified rather than specific parameters to be verified and one or more parameters that need to be verified to verify the item are identified. For example, the verification model identifies a connection to be verified and one or more parameters of the connection that need to be verified are identified. In some embodiments, determining the one or more parameters includes generating a list of status parameters that need to be detected from the device based on the verification model. In some embodiments, determining the one or more parameters includes identifying device/operating system specific parameters to be verified to verify an item of the verification model. For example the verification model includes a verification instruction/parameter that is not specific to a particular device type and/or device operating system and a proxy agent translates the verification instruction to a device type/operating system specific instruction/parameter. By allowing the protocol/format/instruction of the verification model to be specific vendor/operating system agnostic, generation of the verification model is simplified. Because each proxy agent may be specific for a particular type of device vendor/operating system, the proxy agent is the most efficient entity to perform the translation between a generic verification item of the verification model to a specific item particular to the device.

At 606, the determined parameters are detected. In some embodiments, parameter detection is performed when the verification model is received. For example, an initial verification is performed to ensure that the service of the verification model has been properly initialized/configured. In some embodiments, parameter detection is performed periodically. For example, verification is performed at a periodic interval on an ongoing basis to ensure proper functioning of the service continually. In some embodiments, parameter detection is performed periodically (e.g., every periodic interval). In some embodiments, parameter detection is performed dynamically. For example, when a potential material change is detected, parameter detection is invoked and performed to ensure that the service is properly functioning despite the change. Examples of the change may include a change to one or more of the following: a network connection, a device hardware, a device operating system, an application of the device, an error event, and any status of the device associated with the verification model. In another example, when a device (e.g., switch) operating system is informed about a change (e.g., changes to a route/routing table), the operating system notifies the proxy agent that in response triggers parameter detection.

In some embodiments, detecting the determined parameters includes obtaining a status of a parameter. For example, a status of a network connection is obtained. In another example, it is determined whether an identified process is still functioning. In some embodiments, detecting the determined parameters includes obtaining a value of a parameter. For example, a network identifier (e.g., IP address) of an identified network connection is determined. In some embodiments, detecting the determined parameters includes obtaining information reported to the device from another device. For example, the device performing the verification detection receives status reports/messages from its neighbor devices and information included in these reports/messages is obtained. In some embodiments, detecting the determined parameters includes performing an inquiry to another device connected to the device performing the verification detection. For example, an inquiry message is sent to another device to detect the parameter. In another example, a ping message or a request for information may be sent. In some embodiments, detecting the determined parameters includes obtaining a received message from a connected node/device identifying a parameter/status. For example, a Link Layer Discovery Protocol (LLDP) message is received from a peer switch and this message is reported/analyzed to perform verification.

At 608, the detected parameters are reported. For example, one or more of the detected parameters are sent to an application agent (e.g., an application agent of the management server 102 that is tasked with performing the verification) for analysis. In some embodiments, reporting the detected parameters includes performing an analysis to determine a verification result. For example, one or more detected parameters are compared with one or more expected values of the parameters to determine whether the expected values have been detected and an identification of the result of the comparison is included in a report. In some embodiments, reporting detected parameters includes determining a summary of one or more of the detected parameters. For example, the detected parameters are categorized, organized, analyzed, tallied, and/or statistically analyzed and one or more results are included in a provided report. In some embodiments, reporting detected parameters includes publishing to a remote data store. For example, a report is published to data store 104 of FIG. 1.

In some embodiments, the report includes a determined aggregated summary/count of one or more parameters. For example, number of interfaces that are active, inactive, expected, etc. are determined and included in the report in addition to a listing of individual status/parameters (e.g., status identifier, status last update time, etc.) of each interface. In another example, number of sessions (e.g., BGP sessions) that are active, inactive, expected, etc. are determined and included in the report in addition to a listing of individual status/parameters (e.g., session state, status last update time, source/destination IP address/ASN, etc.) of each session. In some embodiments, the report includes identification of LLDP messages and one or more parameters (e.g., identification of sending/receiving interfaces and devices, message timestamps, etc.) of the messages that have been exchanged between the device and its peer device.

Figure 7:
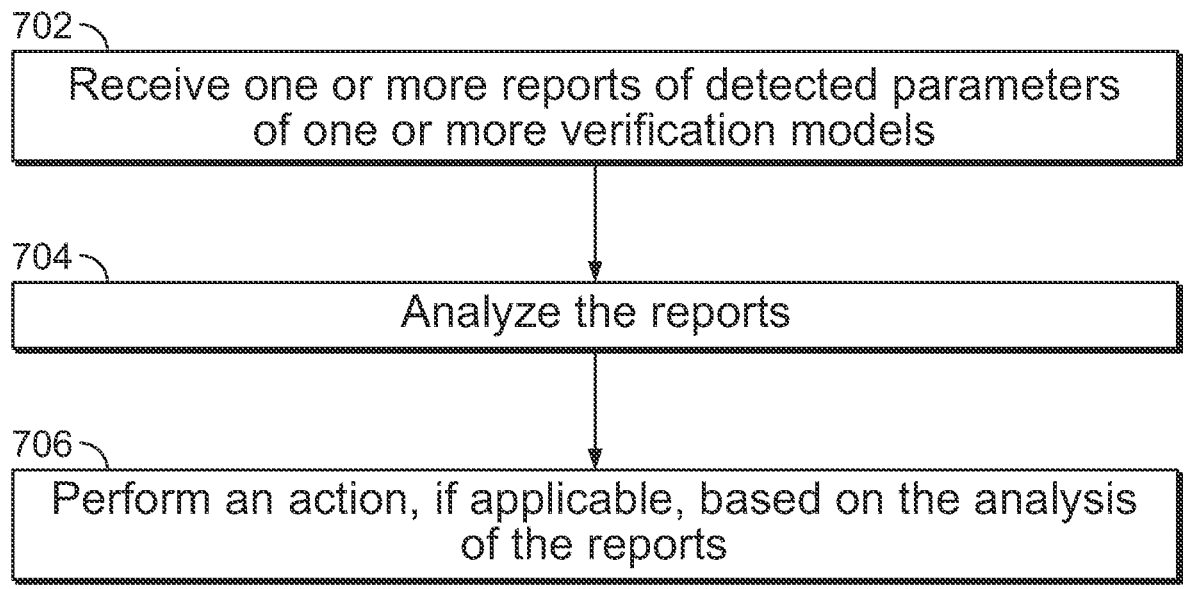
FIG. 7 is a flowchart illustrating an embodiment of a process for analyzing verification reports.

FIG. 7 is a flowchart illustrating an embodiment of a process for analyzing verification reports. The process of FIG. 7 may be implemented on management server 102 of FIG. 1.

At 702, one or more reports of detected parameters of one or more verification models are received. In some embodiments, the received reports are reports provided in 608 from one or more different devices/proxy agents at one or more instances. For example, a report is received from each device that has been configured to provide a service being verified. In some embodiments, receiving the reports includes receiving the reports directly from one or more devices. In some embodiments, receiving the reports includes obtaining/receiving the reports from a central share data store (e.g., data store 104 of FIG. 1). For example, the application agent has subscribed with the data store to receive reports published in the data store. In some embodiments, rather than subscribing with the data store, the application agent periodically polls/checks the data store.

At 704, the reports are analyzed. For example, reported data included in the received reports is correlated, compared, and otherwise analyzed to determine whether the service has been properly implemented/configured and/or is properly functioning. In some embodiments, one or more expected values and/or expected status corresponding to a properly functioning state of the service are known and the reports are analyzed to verify that the expected values/status have been detected. In some embodiments, analyzing the reports includes determining whether an error message and/or an indication of an unexpected state has been reported in the reports.

In some embodiments, an expectation associated with the received reports is verified. For example, one or more rules or tests are performed to verify that a value included in the report is as expected, specified, and/or within a range. In some embodiments, the expectation includes one or more tests to be performed to verify that a set of requirements provided by an interaction agent (e.g., published in 204 of FIG. 2A and received in 302 of FIG. 3A) has been successfully achieved. For example, the received set of network requirements in 202 of FIG. 2A specifies one or more tests to be performed to verify that the set of network requirements has been successfully achieved. For example, in the L3 Clos network example discussed throughout the specification, a test to verify that routing tables have been successfully updated and leaf switch nodes are aware of neighbors to reflect the Clos network configuration is received along with the network requirements received in 202 of FIG. 2A. This test may be published by the interaction agent along with the requirements in 204 of FIG. 2A and the application agent receives the test as the expectation for verification. In some embodiments, the expectation identifies an acceptable range for a resource utilization indicator. In some embodiments, the expectation identifies an error state of the received status.

In some embodiments, performing the analysis includes determining that throughput and/or quality of service/performance metrics are met. In some embodiments, performing the analysis includes determining whether all required connections between devices to provide the desired service have been properly configured/detected across all reports from the devices providing the service. For example, rather than merely checking each report in isolation, data reported in multiple reports from different devices are correlated to determine that connection data/parameters between two devices that are supported to be connected match to create a valid connection. In some embodiments, performing the analysis includes determining whether one or more parameters/connections that are extraneous (or not supposed to exist to provide the desired service) exists. In some embodiments, performing the analysis includes verifying isolation of domains and/or ensuring that one domain is not over utilizing resources.

At 706, an action, if applicable, is performed based on the analysis of the reports. In some embodiments, no action is performed if the data included in the received reports is as expected, specified, and/or within a range. For example, it is determined that the service is properly functioning and/or has been properly configured. In some embodiments, it is determined that the service is not properly functioning and/or has not been properly configured and a message is provided to indicate this error (e.g., via an interaction agent). In some embodiments, an expectation identifies the responsive action to be performed based on the data of the received reports. In some embodiments, performing the action includes reporting a data of the reports. For example, a result of a test is reported (e.g., report a result of a test to verify that the set of network requirements has been successfully achieved). In some embodiments, reporting the data of the reports includes summarizing data of the reports. Reporting the data of the reports may include providing the report/status to an interaction agent (e.g., the interaction agent may provide the report/status to a user). In some embodiments, reporting the data of the reports includes publishing/updating a data record of a system data store such as data store 104 of FIG. 1. For example, a status identifier is published to a data record of the data store that is subscribed by an interaction agent.

In some embodiments, performing the action includes configuring, moving, removing, and/or adding a device of a network and/or a process/program of a device of the network. For example, the application agent generates instructions (e.g., publishes device requirements to a system data store for a proxy agent to implement on a device) to automatically mitigate/fix an error indicated by the status (e.g., repair/replace device that has encountered an error). In one example, when a proxy agent provides a status update that its associated device is overloaded, the application agent may add a new device to a network to offload processing and/or move a processing task of the overloaded device to another network device. The collected status information may be provided by an application agent to an interaction agent as a report and/or a request for action.

In some embodiments, performing the action includes allowing another application agent that is configured to perform the action to perform the action. For example, an application agent that has determined that the received status indicates that the action should be performed informs another application agent (e.g., by publishing to a data store subscribed by the second application agent) to perform the action. In some embodiments, an interaction agent manages which application agent is to perform the action. For example, the interaction agent is informed of the status and instructs (e.g., by publishing requirements to a data store) an application agent that is able to perform the responsive action to perform the responsive action. In some embodiments, performing the responsive action includes providing responsive requirements in response to the status that is received in 302 of FIG. 3A. For example, the responsive requirements are translated to device requirements that will be provided to proxy agents to be implemented.

Figure 9:
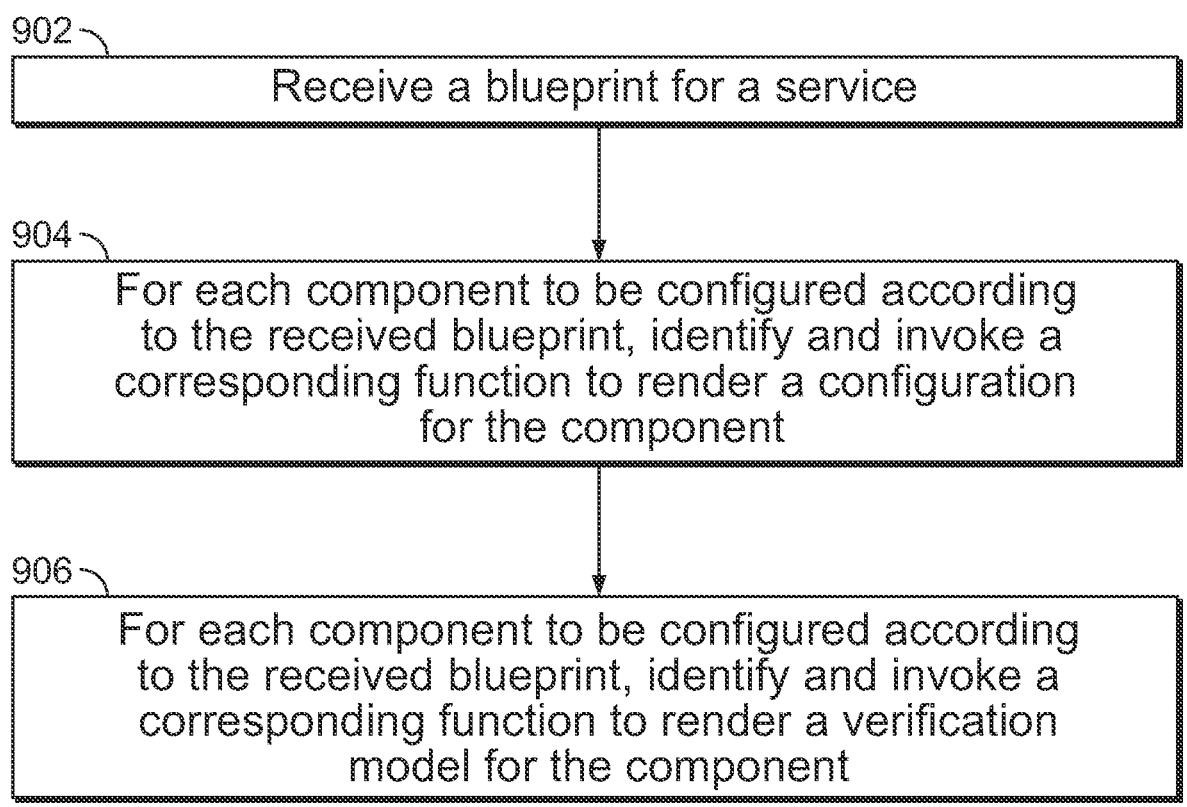
FIG. 9 is a flowchart illustrating an embodiment of a process for rendering configuration/requirements and verification models for system components to provide a service.

FIG. 9 is a flowchart illustrating an embodiment of a process for rendering configuration/requirements and verification models for system components to provide a service. The process of FIG. 9 may be implemented on server 102 of FIG. 1. In some embodiments, at least a portion of the process of FIG. 9 is included in 318 and/or 320 of FIG. 3B.

In some embodiments, at least a portion of the process of FIG. 9 is included in 504 of FIG. 5. In some embodiments, at least a portion of the process of FIG. 9 is performed by a service rendering dispatcher included in server 102 of FIG. 1 that generates device requirements and verification models for network devices (e.g., devices 106, 108, etc. of FIG. 1) to be utilized to provide a desired network service.

At 902, a blueprint for a service is received. In some embodiments, the blueprint identifies system components (e.g., devices/nodes) and one or more of the following between the system components that are to implement an intent (e.g., intent requirements received in 302 of FIG. 3A): logical connectivity, physical connectivity, cabling, and soft resource assignment. In some embodiments, the blueprint is based at least in part on a specified reference network architecture to be utilized to implement specified declarative requirements. For example, a user/network administrator has specified a network architecture to be utilized to provide the network service desired by the specified declarative requirements. The reference architecture may identify a standard manner in which component systems and devices are to be organized to provide a service. For example, the reference architecture identifies a network topology and protocols to be utilized to provide an intended network service. An example of the reference architecture includes a specification that identifies that an L3 Clos type network should be established using the BGP protocol. Another example of the reference architecture includes a specification that identifies that an Access Aggregation type network should be established. In some embodiments, the blueprint identifies the reference network architecture corresponding to the blueprint. In some embodiments, the blueprint is specified directly. For example, a user directly provides the blueprint that was manually generated. In some embodiments, the blueprint is at least in part automatically generated. In some embodiments, a user specifies declarative requirements and a reference architecture and the blueprint is generated automatically and/or interactively. For example, using at least a portion of the process of FIG. 3B (e.g., user may enter the process of FIG. 3B at any of its entrance points), the blueprint is automatically built.

Figure 10A:
FIG. 10A is an example of a blueprint for an L3 Clos type reference network architecture.
Figure 10B:
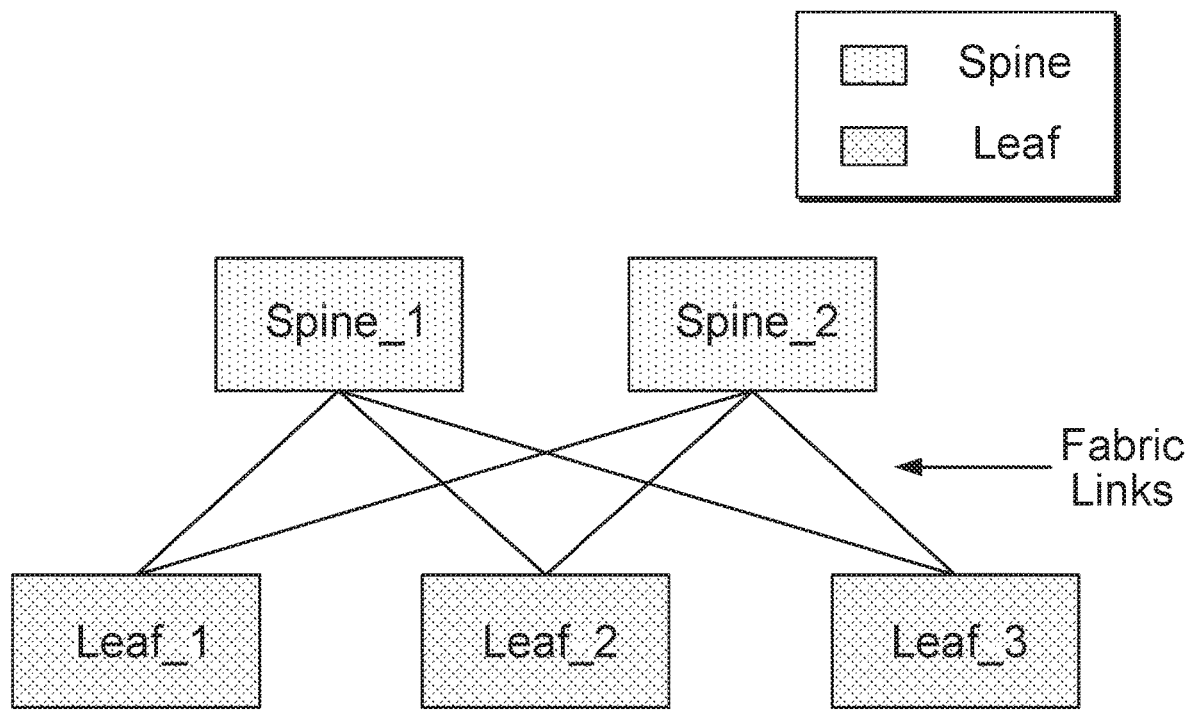
FIG. 10B is a block diagram illustrating an example of system components and links specified by blueprint 1000 of FIG. 10A.

FIG. 10A is an example of a blueprint for an L3 Clos type reference network architecture. Blueprint 1000 identifies in section 1002 that this blueprint is for reference architecture L3 Clos. Section 1004 identifies the system component of the service to be established. There are three nodes to be established and configured as the leaf nodes of the L3 Clos network while there are two nodes to be established and configured as the spine nodes of the L3 Clos network. Section 1006 identifies the connections between the various system components specified in section 1004. Each of the identified connections are specified as providing the role of a fabric connection. FIG. 10B is a block diagram illustrating an example of system components and links specified by blueprint 1000 of FIG. 10A.

Figure 10D:
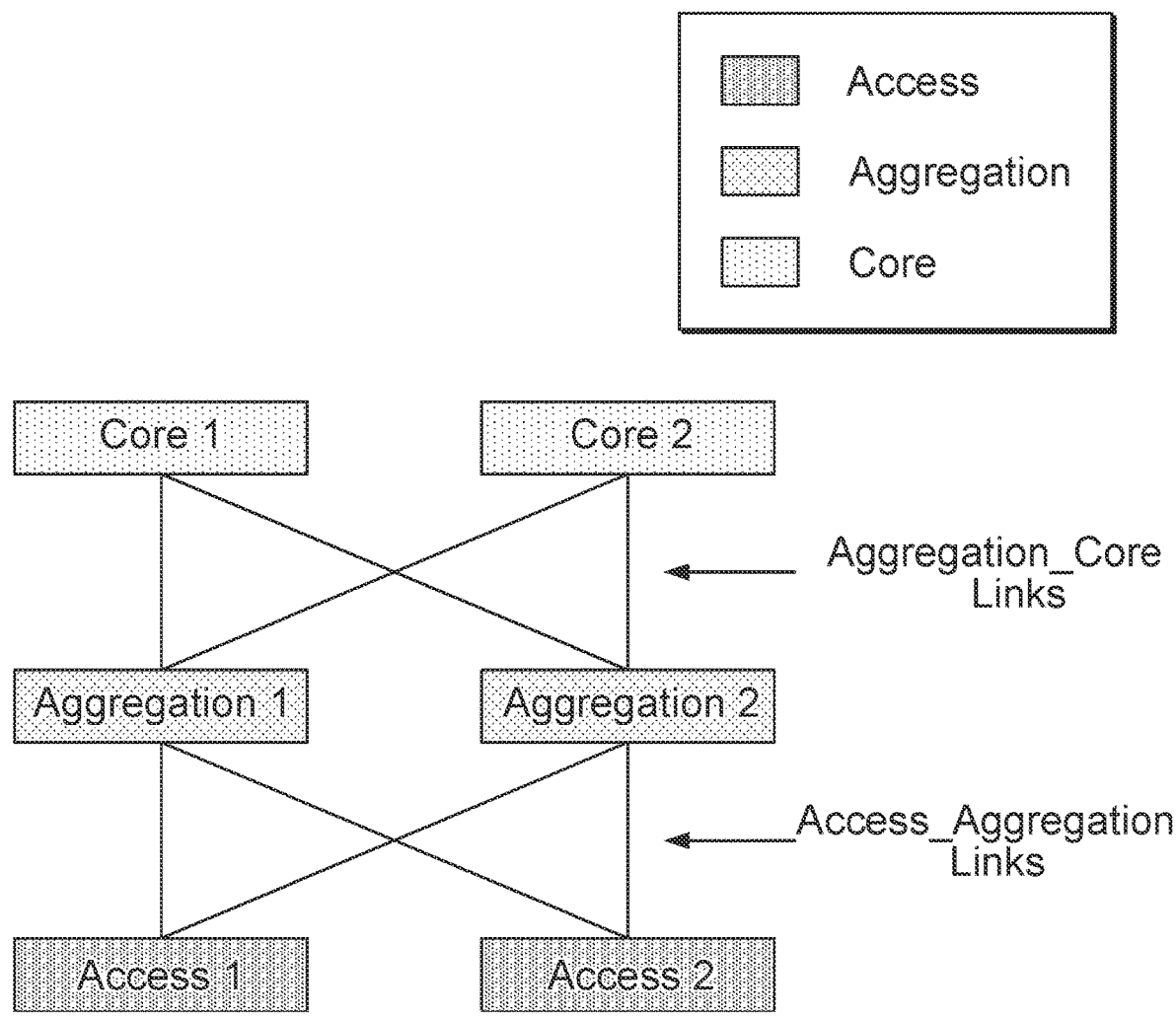
FIG. 10D is a block diagram illustrating an example of system components and links specified by blueprint 1010 of FIG. 10C.

FIG. 10C is an example of a blueprint for an Access Aggregation type reference network architecture. Blueprint 1010 identifies in section 1012 that this blueprint is for an Access Aggregation reference architecture. Section 1014 identifies a component system of the service to be established. There are two nodes to be established and configured as the access nodes of the Access Aggregation network, there are two nodes to be established and configured as the aggregation nodes of the Access Aggregation network, and there are two nodes to be established and configured as the core nodes of the Access Aggregation network. Section 1016 identifies the connections between the various component systems specified in section 1014. Connections between access nodes and aggregation nodes are specified as providing the role of an access aggregation connection. Connections between aggregation nodes and core nodes are specified as providing the role of an aggregation core connection. FIG. 10D is a block diagram illustrating an example of system components and links specified by blueprint 1010 of FIG. 10C.

Returning to FIG. 9, at 904, for each component (e.g., device, node, etc.) to be configured according to the received blueprint, a corresponding service rendering program function to render a configuration for the component is identified and invoked. For example, declarative requirements (e.g., received in 402 of FIG. 4) for nodes of a network service to be established are generated using corresponding program functions. In some embodiments, there exists a plurality of different functions that are each specific to a particular reference architecture and component role within the reference architecture. For example, for each component to be utilized to provide the intended network service, the rendered/output requirement to configure the system component is generated by a particular program function that is specific to the reference architecture and role of the component. In the example of the L3 Clos architecture, there exists a separate function for at least each of the two different component roles (e.g., a rendering function for leaf nodes and a rendering function for spine nodes). In the example of the Access Aggregation architecture, there exists a separate function for at least each of the three different component roles (e.g., a rendering function for access nodes, a rendering function for aggregation nodes, and a rendering function for core nodes).

In some embodiments, identifying the function for each component includes identifying, among a plurality of rendering functions, a function that corresponds to the reference architecture and role of the component within the reference architecture for the component. In some embodiments, in order to support a new reference architecture, a separate function for each possible role (e.g., device type) within the reference architecture is to be provided such that the function can be located and invoked to implement the reference architecture when needed. In some embodiments, the function renders requirements that are to be provided at least in part to the node (e.g., device, a group of devices, etc.) that is implementing the rendered requirements. For example, the requirements are generated in 318 and/or 320 of FIG. 3B and/or received in 402 of FIG. 4. In some embodiments, invoking the function includes providing to the function at least a portion of the blueprint and an identifier of the component to be rendered. For example, an identifier of the blueprint and the identifier of the specific instance of the component are provided as arguments to invoking the function and the function renders the requirements of the component taking into account the connections and connected components as specified in the blueprint.

At 906, for each component (e.g., node) to be configured according to the received blueprint, a corresponding verification model rendering function to render a verification model for the component is identified and invoked. For example, verification models (e.g., generated in 504 and provided in 506 of FIG. 5, received in 602 of FIG. 6, etc.) for nodes of a network service to be established are generated using corresponding program functions. In some embodiments, there exists a plurality of different verification model rendering functions that are each specific to a particular reference architecture and component role within the reference architecture. For example, for each component to be utilized to provide the intended network service, the verification model for the component is generated by a particular program function that is specific to the reference architecture and role of the component. In some embodiments, identifying the verification model generating function for each component includes identifying among a plurality of verification model generating functions, a function that corresponds to the reference architecture and role of the component within the reference architecture for the component. In some embodiments, the verification model is generated as a part of the process of FIG. 6. In some embodiments, the generated verification model is received in 602 of FIG. 6. In some embodiments, invoking the verification model rendering function includes providing to the function at least a portion of the blueprint and an identifier of the component to be rendered. For example, an identifier of the blueprint and the identifier of the specific instance of the component are provided as arguments to the verification model rendering function and the function renders the verification model of the component taking into account the connections and connected components as specified in the blueprint.

Figure 10E:
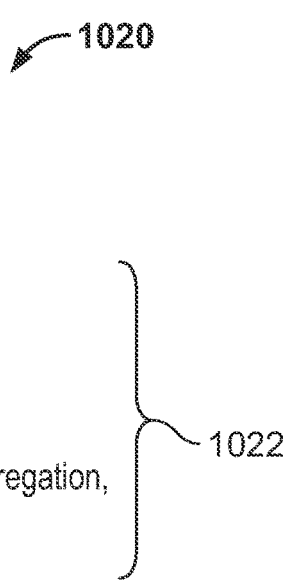
FIG. 10E is an example implementation of a dispatcher for identifying and invoking configuration/requirement rendering functions for example L3 Clos and Access Aggregation reference architecture examples.

In some embodiments, at least a portion of 1004 and/or 1006 is performed by one or more dispatchers that identify and invoke the appropriate functions. For example, one dispatcher performs 1004 while another dispatcher performs 1006. FIG. 10E is an example implementation of a dispatcher for identifying and invoking configuration/requirement rendering functions for example L3 Clos and Access Aggregation reference architecture examples. Section 1022 of implementation 1020 defines the mapping from an identifier pair (pair of a reference architecture identifier and a role identifier) to an identifier of the configuration/requirement rendering function to be invoked for the node corresponding to the pair. Section 1024 of implementation 1020 shows templates for the various corresponding functions where implementation code for the rendering function may be defined.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A method comprising:
    receiving, with one or more processors, an intent identifying one or more declarative requirements for a desired service, wherein the one or more declarative requirements comprises an indication of a network topology;
    selecting, with the one or more processors, for a network device of a plurality of networking devices, a role to implement the network topology;
    selecting, with the one or more processors, from a plurality of program functions, a program function mapped to both the network topology and the selected role, wherein the program function is configured to generate one or more device requirements to configure the network device to provide the selected role;
    invoking, with the one or more processors, the selected program function to generate the one or more device requirements for the network device; and
    outputting, with the one or more processors, the one or more device requirements, wherein the network device is configured to translate the one or more device requirements into a set of native instructions for the network device.

2. The method of claim 1, wherein selecting the role is based on the one or more declarative requirements.

3. The method of claim 1, wherein the one or more declarative requirements further comprises an indication of a number of network devices, the method comprising selecting the plurality of the networking devices to correspond to the number of network devices indicated by the one or more declarative requirements.

4. The method of claim 1, wherein the one or more declarative requirements further comprises an IP address pool and wherein invoking the selected program function to generate the one or more device requirements comprises generating the one or more device requirements to indicate an IP address within the IP address pool.

5. The method of claim 1, wherein the one or more declarative requirements comprises an indication of a protocol to be utilized to provide the desired service.

6. The method of claim 5, wherein the protocol comprises a Border Gateway Protocol (BGP).

7. The method of claim 1, wherein selecting the program function comprises:
    selecting a subset of program functions from the plurality of program functions based on the network topology; and
    selecting the program function from the subset of program functions based on the selected role.

8. The method of claim 7,
    wherein the network topology comprises at least a first role and a second role; and
    wherein a first program function of the subset of program functions maps to both the network topology and the first role and a second program function of the subset of program functions maps to both to the network topology and the second role.

9. The method of claim 8,
    wherein the network topology comprises a Clos network;
    wherein the first role comprises a spine; and
    wherein the second role comprises a leaf.

10. The method of claim 8,
    wherein the network topology comprises an access aggregation network;
    wherein the first role comprises an aggregation node; and
    wherein the second role comprises an aggregation node or a core node.

11. The method of claim 1, wherein the desired service includes a network service.

12. The method of claim 1, wherein the plurality of networking devices includes a plurality of nodes of the network topology.

13. The method of claim 1, wherein the plurality of networking devices includes a network switch device.

14. The method of claim 1, wherein the network topology is utilized to provide the desired service.

15. The method of claim 1, wherein the desired service is able to be rendered using at least one of a plurality of different network topologies.

16. The method of claim 1, wherein the network topology identifies an L3 Clos network architecture.

17. The method of claim 1, wherein the one or more declarative requirements indicates a reference architecture, wherein the reference architecture identifies the network topology, the method further comprising selecting, with the one or more processors, a verification model program function based on the reference architecture and invoking, with the one or more processors, the verification model program function.

18. The method of claim 17, wherein selecting the verification model program function is further based on the selected role of the network device.

19. A system comprising:
one or more processors configured to:
receive an intent identifying one or more declarative requirements of a desired service, wherein the one or more declarative requirements comprises an indication for a network topology;
select, for a network device of a plurality of networking devices, a role to implement the network topology;
select, from a plurality of program functions, a program function mapped to both the network topology and the selected role, wherein the program function is configured to generate one or more device requirements to configure the network device to provide the selected role;
invoke the selected program function to generate the one or more device requirements for the network device; and
output the one or more device requirements, wherein the network device is configured to translate the one or more device requirements into a set of native instructions for the network device; and a memory coupled to the one or more processors and configured to provide the one or more processors with instructions.

20. A non-transitory computer-readable medium comprising instructions for causing one or more processors to:
receive an intent identifying one or more declarative requirements for a desired service, wherein the one or more declarative requirements comprises an indication of a network topology;
select, for a network device of a plurality of networking devices, a role to implement the network topology;
select, from a plurality of program functions, a program function mapped to both the network topology and the selected role, wherein the program function is configured to generate one or more device requirements to configure the network device to provide the selected role;
invoke the selected program function to generate the one or more device requirements for the network device; and
output the one or more device requirements, wherein the network device is configured to translate the one or more device requirements into a set of native instructions for the network device.

* * * * *